(12) United States Patent
Sasaki et al.

(10) Patent No.: US 7,050,701 B1
(45) Date of Patent: May 23, 2006

(54) INFORMATION RECORDING MEDIUM, INFORMATION RECORDING/REPRODUCING METHOD, AND INFORMATION RECORDING/REPRODUCING DEVICE

(75) Inventors: Miyuki Sasaki, Moriguchi (JP); Yoshiho Goto, Osaka (JP); Yoshihisa Fukushima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/787,427

(22) PCT Filed: Sep. 24, 1999

(86) PCT No.: PCT/JP99/05207

§ 371 (c)(1),
(2), (4) Date: Mar. 23, 2001

(87) PCT Pub. No.: WO00/19432

PCT Pub. Date: Jun. 4, 2000

(30) Foreign Application Priority Data

Sep. 25, 1998 (JP) ................................. 10/271240

(51) Int. Cl.
*H04N 5/91* (2006.01)
(52) U.S. Cl. ................... 386/95; 386/125; 386/126
(58) Field of Classification Search ................. 386/46, 386/95, 112, 125, 126; 369/53.24
See application file for complete search history.

(56) References Cited

U.S. PATENT DOCUMENTS

| | | | |
|---|---|---|---|
| 5,210,734 A | 5/1993 | Sakurai | |
| 5,579,516 A * | 11/1996 | Van Maren et al. | ............ 707/1 |
| 5,594,550 A | 1/1997 | Juri et al. | |
| 5,655,050 A | 8/1997 | Yamamoto et al. | |
| 5,701,386 A | 12/1997 | Yoneyama | |
| 5,732,066 A | 3/1998 | Moriya et al. | |
| 5,867,466 A * | 2/1999 | Igarashi et al. | .......... 369/53.24 |
| 5,867,475 A | 2/1999 | Moriya et al. | |
| 5,940,853 A | 8/1999 | Ooi et al. | |
| 5,978,958 A | 11/1999 | Tanaka et al. | |
| 6,282,365 B1 * | 8/2001 | Gotoh et al. | ................... 386/95 |

FOREIGN PATENT DOCUMENTS

| | | |
|---|---|---|
| EP | 0507397 | 10/1992 |
| JP | 2-90340 | 3/1990 |
| JP | 2-132516 | 5/1990 |

OTHER PUBLICATIONS

English Language Abstract of JP 2-132516.
English Language Abstract of JP 2-90340.

* cited by examiner

*Primary Examiner*—Huy T. Nguyen
(74) *Attorney, Agent, or Firm*—Greenblum & Bernstein, P.L.C.

(57) ABSTRACT

In the case of a conventional data structure of a disk on which data is recorded by a CD-R multisession method, a dedicated command is needed to read the latest file structure recorded during the last session by reading chainedly the first address of the subsequent session recorded in the read-in area of a session, and it is necessary to close the session so as to read data by means of a reproduction-only device. According to the invention, a set of information on management of unrecorded areas and a set of information on management of file structure/file information are recorded as chain-type information (111, 115, . . . ) and are read chainedly in a volume space so as to acquire the latest management information. Open maintenance information (105, 125) is recorded at the start of recording and close maintenance information (107, 126) is recorded at the end of the recording. The information is read chainedly, and thus information on volume is acquired.

10 Claims, 14 Drawing Sheets

INFORMATION RECORDING MEDIUM, INFORMATION RECORDING/REPRODUCING METHOD, AND INFORMATION RECORDING/REPRODUCING DEVICE

TECHNICAL FIELD

The present invention relates to a data storage medium to which files managed using a volume/file structure are recorded and reproduced, and in which the number of data recording operations to any same area is limited, and to a data recording and reproducing method and data recording and reproducing apparatus using this data storage medium. More particularly, the present invention relates to a data storage medium wherein address information indicative of an area that is not recorded when a volume/file structure or file is additionally written from one end of a data recording area, and address information for the latest file management information, are managed within a file structure; and integrity information indicates the status of volume; and relates further to a data recording and reproducing method and a data recording and reproducing apparatus which use this data storage medium.

BACKGROUND ART

While media of various types have been used in recent years for recording digital data, CD-R discs in particular have quickly become commonly used as a low-cost recordable optical disc medium. The multi-session method used for writing data to these CD-R discs is now well known.

Data recording using this multi-session method is described next below with reference to accompanying figures.

FIG. 12 shows the data structure of a CD-R disc to which files managed using the volume/file structure defined in the ISO 9660 standard are recorded using a multi-session method. In a multi-session recording method, files and volume/file structure for managing the files are recorded in session units. Each session has a lead-in area, an inner link area, a user data area, and a lead-out area. It is to be noted that only the first session does not have a lead-in area. In addition, an outer link area is formed between sessions.

When recording a data session, files and volume/file structure for managing the file are first recorded to the user data area. The lead-out area is then recorded. This lead-out area is recorded to make data reproduction easier on a CD-ROM drive which is unable to detect a location in an unrecorded area on a CD-R disc because it is unable to detect the wobble address recorded to the CD-R disc. Data indicative of the address for a next session or user data area is then recorded to the lead-in area. A run-in block and run-out block are additionally recorded at the beginning and end of each area when recording to the user data area, lead-in area, or lead-out area. The run-in and run-out blocks are also partially overwritten on disc, and these overwritten areas are referred to as link blocks. An inner link area comprising a run-out block, link block, and run-in block is thus formed between a lead-in area and user data area and between a user data area and lead-out area, and an outer link area having the same configuration is formed between a lead-out area and lead-in area.

FIG. 13 shows the directory structure used for managing files recorded to a CD-R disc in conjunction with the data structure shown in FIG. 12. The directory structure shown in FIG. 13 has a subdirectory (Dir-A) for managing a data file (File-a), a subdirectory (Dir-B) for managing a data file (File-b), and a subdirectory (Dir-C) for managing a data file (File-c) below the root directory. When data file (File-a), data file (File-b), and data file (File-c) are sequentially recorded during a first session, second session, and third session in accordance with this directory structure, the data structure described above with reference to FIG. 12 is formed on the CD-R disc.

FIG. 14 is a flow chart describing a recording operation for forming the data structure shown in FIG. 12 on a disc. The data recording operation performed each session is described next below according to the steps shown in this flow chart.

(S1401) When a CD-R disc is inserted into the disk recorder, the disk recorder accesses the lead-in area reserved at a specific location at the inside circumference of the disc, and attempts to read the TOC data from this lead-in area. This TOC data is a table of contents for the data recorded on the data storage medium. If the TOC data is reproduced from the lead-in area, a step (S1402) for retrieving the following session data is performed. However, if the data could not be reproduced because the lead-in area is unrecorded, the session data recording operation is performed according to the procedure beginning in step (S1403).

(S1402) If the TOC data is reproduced from the lead-in area, the disk recorder reads the start address of the following session contained in this TOC data, returns to step (S1401), and then tries to reproduce data from the lead-in area of the following session.

(S1403) When a lead-in area to which no data is recorded is detected, the file recorded as the session data and the volume/file structure for managing said file are generated as follow.

First, when data is not reproduced from the lead-in area, the data file (File-a) to be recorded as the data for the first session, subdirectory (Dir-A) for managing data file (File-a), a directory file for managing the root directory, and volume/file structure, such as a primary volume descriptor and path table, for managing these files and the directory file, are generated according to the ISO 9660 standard.

If TOC data is reproduced from the lead-in area, the volume/file structure and directory file are read using the user data area start address contained in the most recently read TOC data. For example, with a disc to which only a first session has been recorded, data is read from user data area 1202; with a disc to which a second session has also been recorded, data is read from user data area 1205. The content of the volume/file structure is then updated by adding thereto the file newly recorded to the read data and a directory file for managing said file. For example, data file (File-b) and the subdirectory (Dir-B) for managing data file (File-b) are added to the data read from user data area 1202 on a disc to which only a first session has been recorded, and a new volume/file structure is then generated; data file (File-c) and the directory file (Dir-C) of the subdirectory for managing data file (File-c) are added to the data read from user data area 1205 on a disc to which a second session has also been recorded, and a new volume/file structure is then generated.

(S1404) When the volume/file structure to be recorded to a user data area is generated, a lead-in area and run-out block of predetermined recording size are skipped, a predefined link block/run-in block and link block/run-out block are added before and after the recording data generated in step (S1403), and the recording data is continuously recorded.

(S1405) When data recording to the user data area is completed, recording data having a predefined link block/run-in block and link block/run-out block added before and after the data recorded to the lead-out area is generated. The resulting recording data is then recorded continuously from the link block following the run-out block recorded in step (S1404). When recording the first session, for example, this operation records lead-out area 1203 and the link block/run-in block and run-out block/link block located therebefore and thereafter. When recording a second session, this operation records lead-out area 1206 and the link block/run-in block and run-out block/link block located therebefore and thereafter.

(S1406) When recording data to the lead-out area is completed, the start address for the next session is calculated with reference to the predefined recording size of the outer link area. The calculated start address of the next session is embedded with the start address of the user data area recorded in step (S1404) in the TOC data recorded to the lead-in area.

Recording data comprising predefined link block/run-in block and run-out block/link block units before and after the recording data for the lead-in area is then generated. The resulting recording data is then recorded continuously from a specific position at the inside circumference of the disk if the first session is being recorded, and from the link block following the run-out block recorded in step (S1405) if a second or third session is being recorded. As a result of this recording operation, the lead-in area 1201 at the most inside circumference and the run-out block/link block located immediately thereafter are recorded in the recording operation for a first session, for example. In a recording operation for a second session, the lead-in area 1204 and the link block/run-in block and run-out block/link block units positioned therebefore and thereafter are recorded, and the data recording operation ends.

The data recording operation described above forms a multi-session data structure such as shown in FIG. 12 on the disc. A logical sector number (LSN) is assigned to each sector in the data structure shown in FIG. 12 with the first sector in the user data area in the first session designated 0, and the logical sector number rising continuously at each successive sector. The volume space is defined as the area beginning from the sector at LSN 0.

The operation whereby a data file (File-a) is reproduced from the first session of a disk having a data structure as shown in FIG. 12 is described next below with reference to FIG. 12 and FIG. 14.

When a CD-R disc is inserted to a disc reader, the disc reader follows the procedure shown in steps (S1401) to (S1403) in the flow chart in FIG. 14 to read the latest volume/file structure 1220 from the user data area of the third session. If a CD-ROM drive is connected to a computer system, the host computer obtains the start address for the user data area of the third session to which the latest volume/file structure is recorded by executing READ TOC command. Using this start address, it then calculates the LSN of the sector to which the latest volume/file structure is recorded, and reads this structure from the disc.

Next, when the latest volume/file structure 1220 is read, the structure is interpreted according to the ISO 9660 standard using the primary volume descriptor 1221, path table 1222, root directory 1223, and directory file (Dir-A) 1224 for managing data file (File-a) 1225. The recording position of the data file is then read from the directory record of the data file (File-a) 1225 contained in directory file (Dir-A) 1224.

The data file (File-a) 1225 recorded to the user data area of the first session is then reproduced based on said data file recording position.

With a multi-session data storage medium recorded as described above, TOC data recorded to a lead-in area outside the volume space must be read using a special command such as the above-noted READ TOC command in order to find an unrecorded area of the medium for recording a data file or file management information for managing the data file to the medium, or to find the latest file management information on the medium for reproducing a data file or file management information for managing a data file on the medium.

Furthermore, when a read-only disk drive without the ability to detect a disc location from an unrecorded area accesses an unrecorded area, the head uncontrollable because a servo signal cannot be detected, resulting possibly in contact with the disc and the disc thus being scratched. In order for a CD-ROM drive to access such an unrecorded area, it is therefore necessary to detect the unrecorded area using a special method such as detecting the presence or absence of a servo signal.

Furthermore, when a disk is removed from a CD-R drive partially through a data recording session and is then inserted to a CD-ROM drive, the CD-ROM drive cannot detect whether impartially recorded data is present on the disc using only the information in the volume space because information indicating that data recorded was started is not recorded to the disk.

The present invention solves the above problems, and has as its object to provide a data storage medium enabling retrieval of unrecorded areas and recording and reproduction of data files recorded to the medium and file management information for managing these data files using only the volume/file structure, and enabling a read-only disk drive to detect the data recording status.

DISCLOSURE OF INVENTION

The above object is achieved by means of a data storage medium in which a file managed by a volume/file structure is recorded and reproduced from one end of a data recording area to which a number of data recording operations is limited, the data storage medium comprising a partition descriptor as part of volume structure recorded in a formatting process and containing an address to structure for managing unallocated space, and an unallocated space ICB that is serially updated and recorded as part of file structure and contains an address to structure for managing unallocated space, and the data structure thereof.

The above object is achieved by means of a data storage medium in which a file managed by a volume/file structure is recorded and reproduced from one end of a data recording area to which a number of data recording operations is limited, the data storage medium comprising a logical volume descriptor as part of volume structure recorded in a formatting process and containing an address to structure for managing a file set; a file set descriptor containing an address to structure for managing a root directory; and a root directory ICB that is serially updated and recorded as part of file structure and contains an address to structure for managing a root directory, and the data structure thereof.

The above object is achieved by means of a data storage medium in which a file managed by a volume/file structure is recorded and reproduced from one end of a data recording area to which a number of data recording operations is limited, the data storage medium comprising an open volume logical volume descriptor as part of volume structure recorded in a formatting process and containing an address to closed volume logical volume integrity information; a step for recording an open volume logical volume integrity descriptor as part of volume structure recorded in a volume opening process, the open volume logical volume integrity descriptor containing an address to closed volume logical volume integrity information; and a step for recording a closed volume logical volume integrity descriptor as part of volume structure recorded in a volume closing process, the closed volume logical volume integrity descriptor containing an address to open volume logical volume integrity information, and the data structure thereof.

The above object is achieved by means of a data recording method for accomplishing a data recording operation to a data storage medium in which a file managed by a volume/file structure is recorded and reproduced from one end of a data recording area to which a number of data recording operations is limited, the data recording method comprising such processing steps as: a step for recording in a formatting process as part of volume structure a partition descriptor containing an address to structure for managing unallocated space; a step for recording an unallocated space ICB in a formatting process as chaining information that is serially updated and recorded file structure, the unallocated space ICB containing an address to structure for managing unallocated space; and a step for recording an unallocated space ICB in a file recording process as a part of chaining information that is serially updated and recorded file structure, the unallocated space ICB containing an address to structure for managing unallocated space.

The above object is achieved by means of a data recording method for accomplishing a data recording operation to a data storage medium in which a file managed by a volume/file structure is recorded and reproduced from one end of a data recording area to which a number of data recording operations is limited, the data recording method comprising such processing steps as: a step for recording in a formatting process as part of volume structure a logical volume descriptor containing an address to structure for managing a file set; a step for recording in a formatting process as part of volume structure a file set descriptor containing an address to structure for managing a root directory; and a step for recording in a file recording process as chaining information that is serially updated and recorded file structure a root directory ICB containing an address to structure for managing a root directory.

The above object is achieved by means of a data recording method for accomplishing a data recording operation to a data storage medium in which a file managed by a volume/file structure is recorded and reproduced from one end of a data recording area to which a number of data recording operations is limited, the data recording method comprising such processing steps as: a step for recording in a formatting process as part of volume structure an open volume logical volume descriptor containing an address to closed volume logical volume integrity information; a step for recording in a volume opening process an open volume logical volume integrity descriptor containing an address to closed volume logical volume integrity information; and a step for recording in a volume closing process a closed volume logical volume integrity descriptor containing an address to open volume logical volume integrity information.

The above object is achieved by means of a data recording device for accomplishing a data recording operation to a data storage medium in which a file managed by a volume/file structure is recorded and reproduced from one end of a data recording area to which a number of data recording operations is limited, the data recording device comprising such processing means as: a means for recording in a formatting process a partition descriptor as part of volume structure, the partition descriptor containing an address to structure for managing unallocated space; a means for recording an unallocated space ICB in a formatting process as chaining information that is serially updated and recorded file structure, the unallocated space ICB containing an address to structure for managing unallocated space; and a means for recording an unallocated space ICB in a file recording process as a part of chaining information that is serially updated and recorded file structure, the unallocated space ICB containing an address to structure for managing unallocated space.

The above object is achieved by means of a data recording device for accomplishing a data recording operation to a data storage medium in which a file managed by a volume/file structure is recorded and reproduced from one end of a data recording area to which a number of data recording operations is limited, the data recording device comprising such processing means as: a means for recording in a formatting process as part of volume structure a logical volume descriptor containing an address to structure for managing a file set; a means for recording in a formatting process as part of volume structure a file set descriptor containing an address to structure for managing a root directory; and a means for recording in a file recording process as chaining information that is serially updated and recorded file structure a root directory ICB containing an address to structure for managing a root directory.

The above object is achieved by means of a data recording device for accomplishing a data recording operation to a data storage medium in which a file managed by a volume/file structure is recorded and reproduced from one end of a data recording area to which a number of data recording operations is limited, the data recording device comprising such processing means as: a means for recording in a formatting process as part of volume structure an open volume logical volume descriptor containing an address to closed volume logical volume integrity information; a means for recording in a volume opening process an open volume logical volume integrity descriptor containing an address to closed volume logical volume integrity information; and a means for recording in a volume closing process a closed volume logical volume integrity descriptor containing an address to open volume logical volume integrity information.

The above object is achieved by means of a data reproducing method for accomplishing a data reproducing operation with a data storage medium in which a file managed by a volume/file structure is recorded and reproduced from one end of a data recording area to which a number of data recording operations is limited, the data reproducing method comprising such processing steps as: a step for reproducing from volume structure a logical volume descriptor containing an address to structure for managing a file set; a step for reproducing from volume structure a file set descriptor containing an address to structure for managing a root directory; and a step for reproducing from chaining information that is serially updated and recorded file structure a root directory ICB containing an address to structure for managing a latest root directory.

The above object is achieved by means of a data reproducing method for accomplishing a data reproducing operation with a data storage medium in which a file managed by a volume/file structure is recorded and reproduced from one end of a data recording area to which a number of data recording operations is limited, the data reproducing method comprising such processing steps as: a step for reproducing from volume structure an open volume logical volume descriptor containing an address to closed volume logical volume integrity information; a step for reproducing from an open volume integrity information area an open volume logical volume integrity descriptor containing an address to closed volume logical volume integrity information; a step for reproducing from a closed volume integrity information area a closed volume logical volume integrity descriptor containing an address to open volume logical volume integrity information; a step for reproducing from an overrun extent a closed volume logical volume integrity descriptor containing an address to open volume logical volume integrity information; and a step for reproducing from an overrun extent an open volume logical volume integrity descriptor containing an address to closed volume logical volume integrity information.

The above object is achieved by means of a data reproducing device for accomplishing a data reproducing operation with a data storage medium in which a file managed by a volume/file structure is recorded and reproduced from one end of a data recording area to which a number of data recording operations is limited, the data reproducing device comprising such processing means as: a means for reproducing from with volume structure a logical volume descriptor containing an address to structure for managing a file set; a means for reproducing from within volume structure a file set descriptor containing an address to structure for managing a root directory; and a means for reproducing from chaining information that is serially updated and recorded file structure a root directory ICB containing an address to structure for managing a latest root directory.

The above object is achieved by means of a data reproducing device for accomplishing a data reproducing operation with a data storage medium in which a file managed by a volume/file structure is recorded and reproduced from one end of a data recording area to which a number of data recording operations is limited, the data reproducing device comprising such processing means as: a means for reproducing from volume structure an open volume logical volume descriptor containing an address to closed volume logical volume integrity information; a means for reproducing from an open volume integrity information area an open volume logical volume integrity descriptor containing an address to closed volume logical volume integrity information; a means for reproducing from a closed volume integrity information area a closed volume logical volume integrity descriptor containing an address to open volume logical volume integrity information; a means for reproducing from an overrun extent an open volume logical volume integrity descriptor containing an address to closed volume logical volume integrity information; and a means for reproducing from an overrun extent a closed volume logical volume integrity descriptor containing an address to open volume logical volume integrity information.

BEST MODE FOR CARRYING OUT THE INVENTION

The preferred embodiments of the present invention are described below with reference to the accompanying figures.

EMBODIMENT 1

A data storage medium for recording files managed with a volume/file structure as defined by the ISO 13346 standard using a data storage medium such as a CD-R disc or CD-RW disc to which the number of data recording operations to a same disc area is limited, and a data recording and reproducing method and data recording and reproducing apparatus using this data storage medium, are described below as a preferred embodiment of the present invention with reference to the accompanying figures. It is to be noted that unless otherwise specifically noted, the various descriptors, pointers, and other elements recorded to the data storage medium as the volume/file structure in the following description shall be those used in a data structure conforming to ISO 13346.

Figure 5:
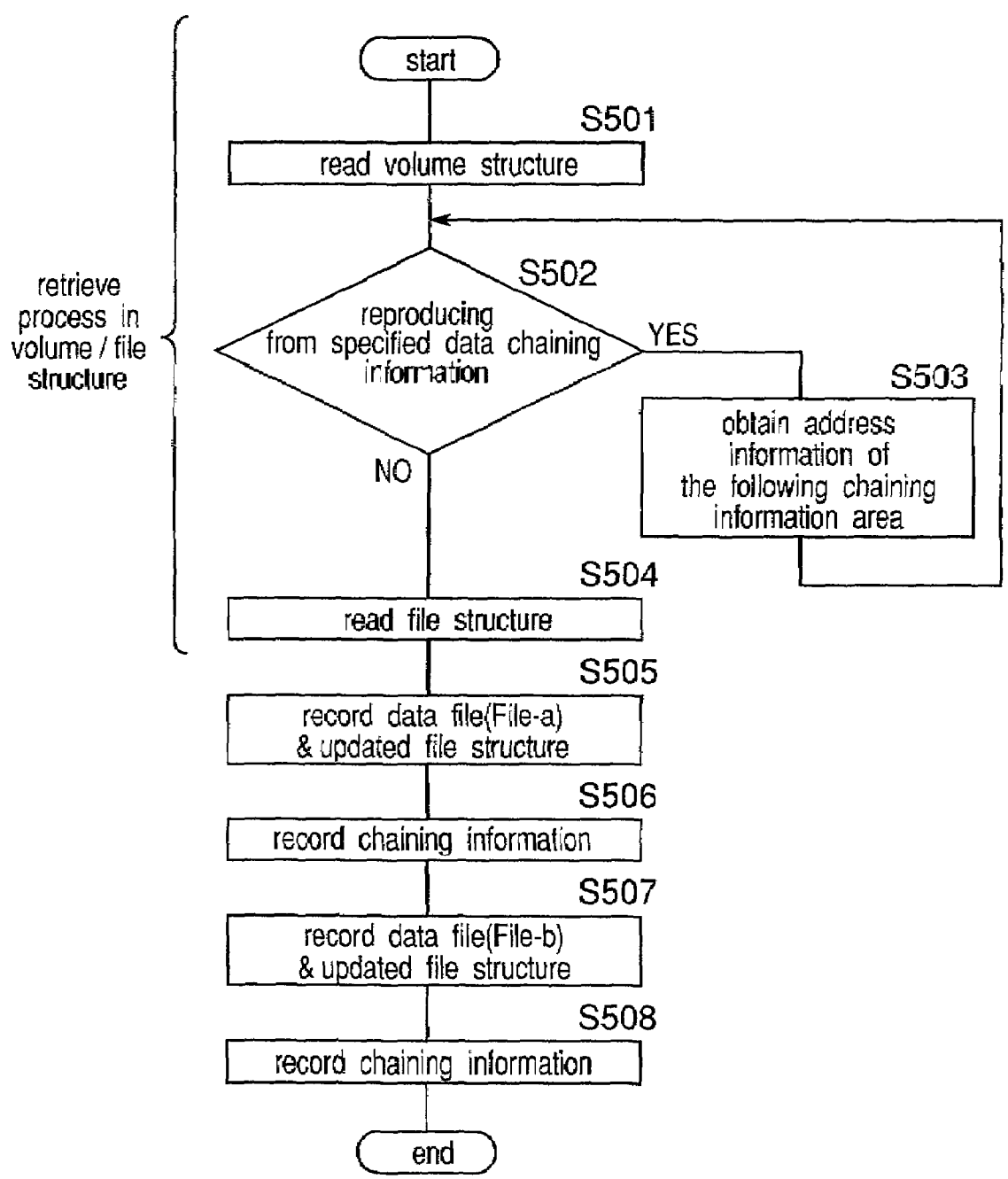
FIG. 5 is a flow chart describing a file recording process of a data recording and reproducing apparatus according to the present invention.
Figure 7:
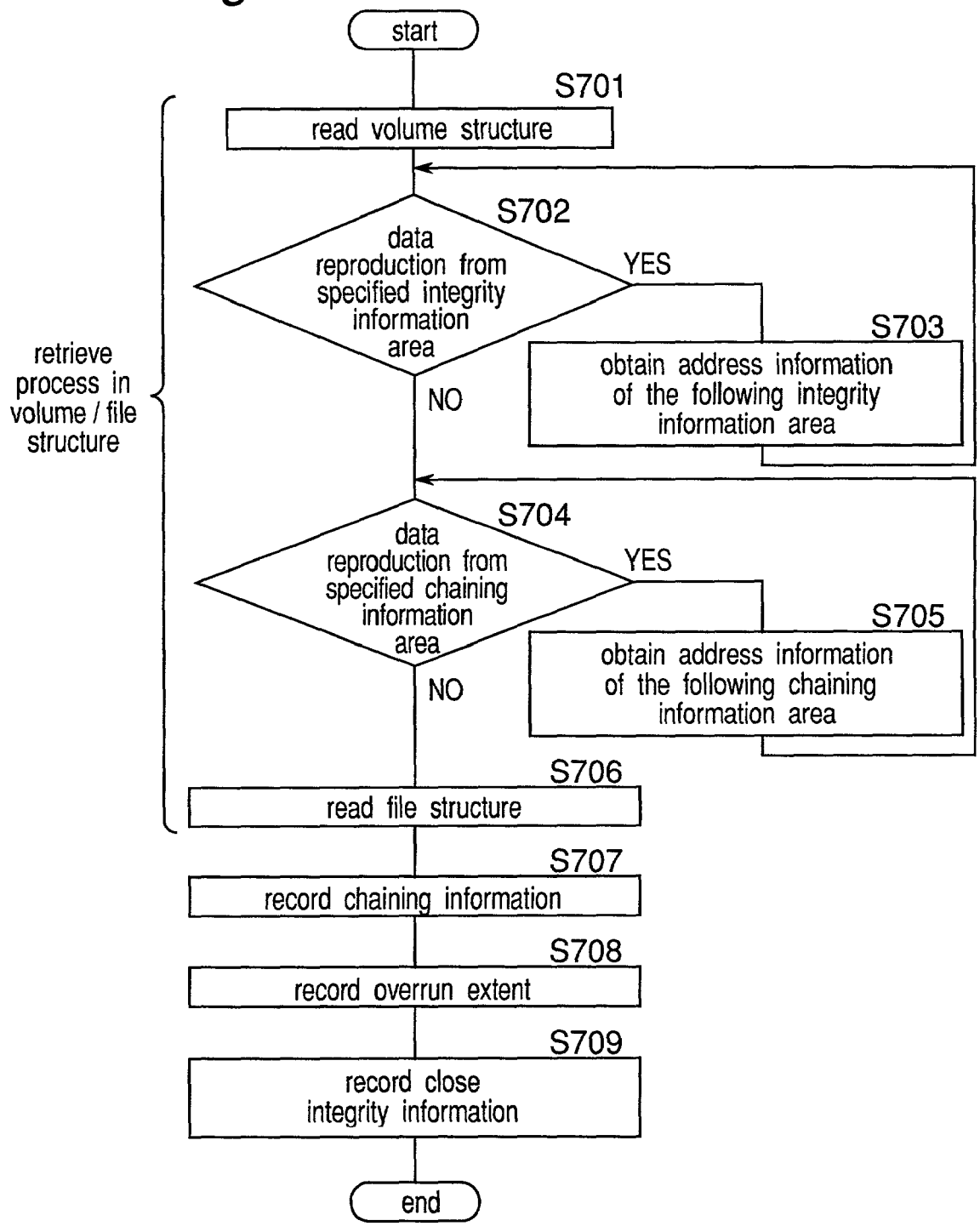
FIG. 7 is a flow chart describing a closing process of a data recording and reproducing apparatus according to the present invention.
Figure 9:
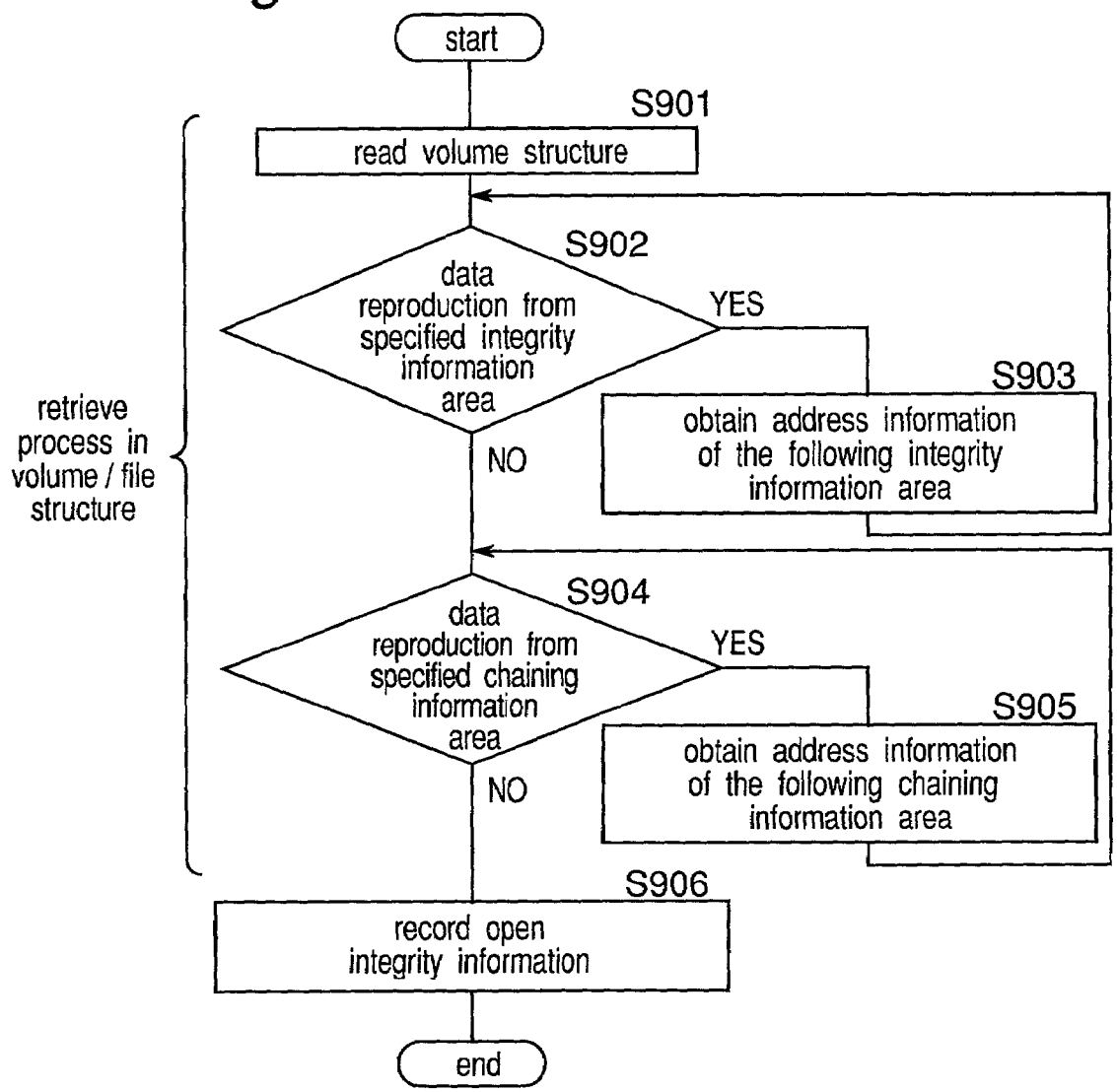
FIG. 9 is a flow chart describing an opening process of a data recording and reproducing apparatus according to the present invention.

The area structure of a data storage medium is described first below with reference to FIG. 1, and the data recording and reproducing apparatus is described with reference to the block diagram in FIG. 2. After then describing a process for formatting this data storage medium with reference to FIG. 3, the file recording process as shown in FIG. 5, the closing process as shown in FIG. 7, and the opening process as shown in FIG. 9, the data structure that is characteristic of a data storage medium according to the present invention is described in detail. Finally, a process for reproducing files from this data storage medium is described with reference to FIG. 11.

Figure 1:
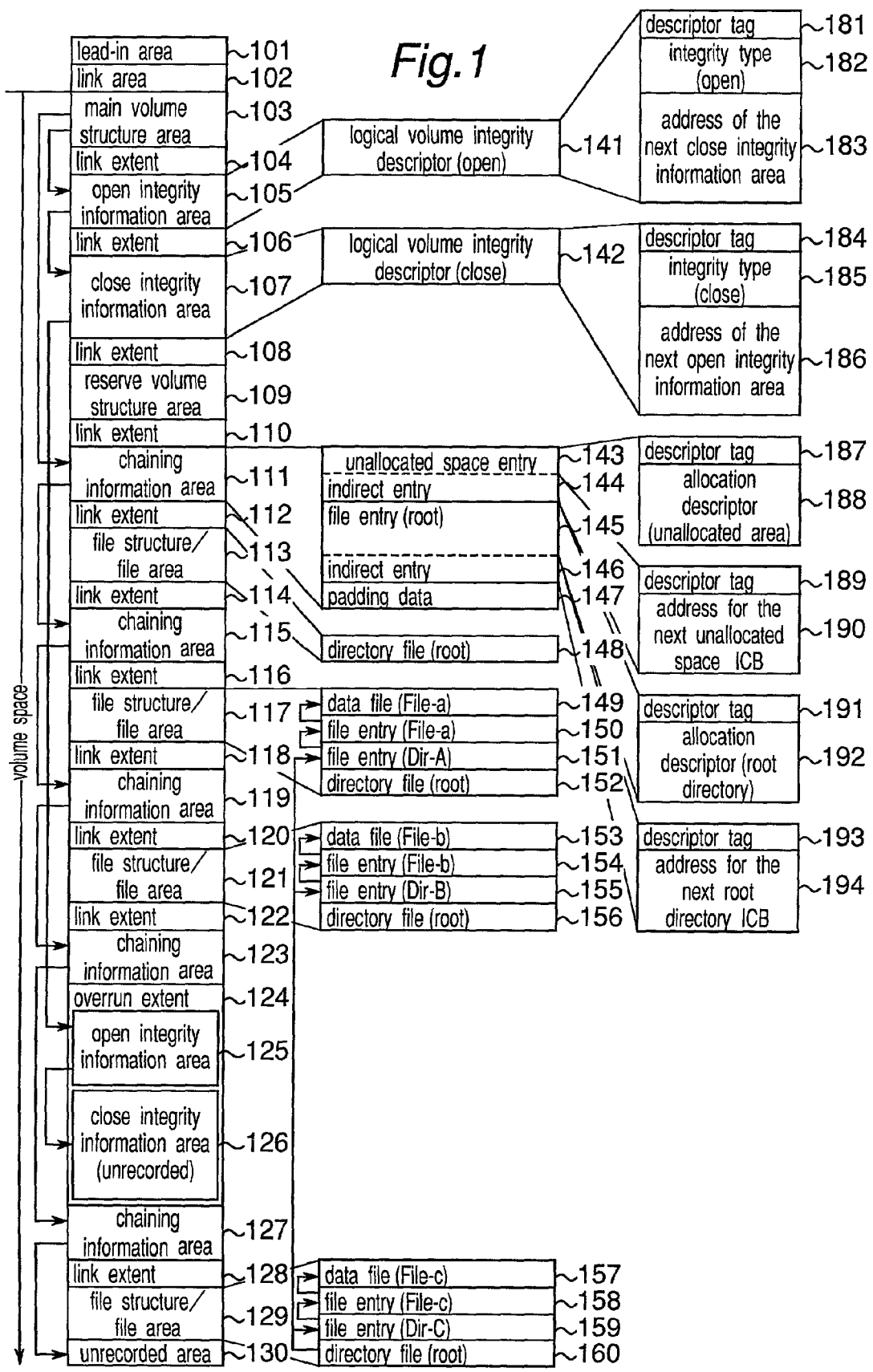
FIG. 1 is a data structure diagram showing the area structure in a data storage medium according to a preferred embodiment of the present invention.

FIG. 1 is a data structure diagram showing the area structure written to a data storage medium according to this preferred embodiment of the invention. As shown in FIG. 1, the data recording area starts from lead-in area 101 and has the volume space formed with link area 102 between the lead-in area 101 and the volume space. Starting from the main volume structure area 103 to which volume structure is recorded, the disk formatting process forms a reserve volume structure area 109, to which a copy of the volume structure is recorded, together with link area 102 and part of link extent 104, part of link extent 108, and part of link extent 110. Next, an open integrity information area 105 for recording a logical volume integrity descriptor indicative of an open status characteristic of the present invention, a chaining information area 111 for recording chaining information containing an unallocated space ICB (information control block) that is likewise characteristic of the present invention and a root directory ICB, and file structure/file area 113 containing a root directory file, are formed in conjunction with link extent 104, part of link extent 106, link extent 110, link extent 112, and part of link extent 114.

Figure 13:
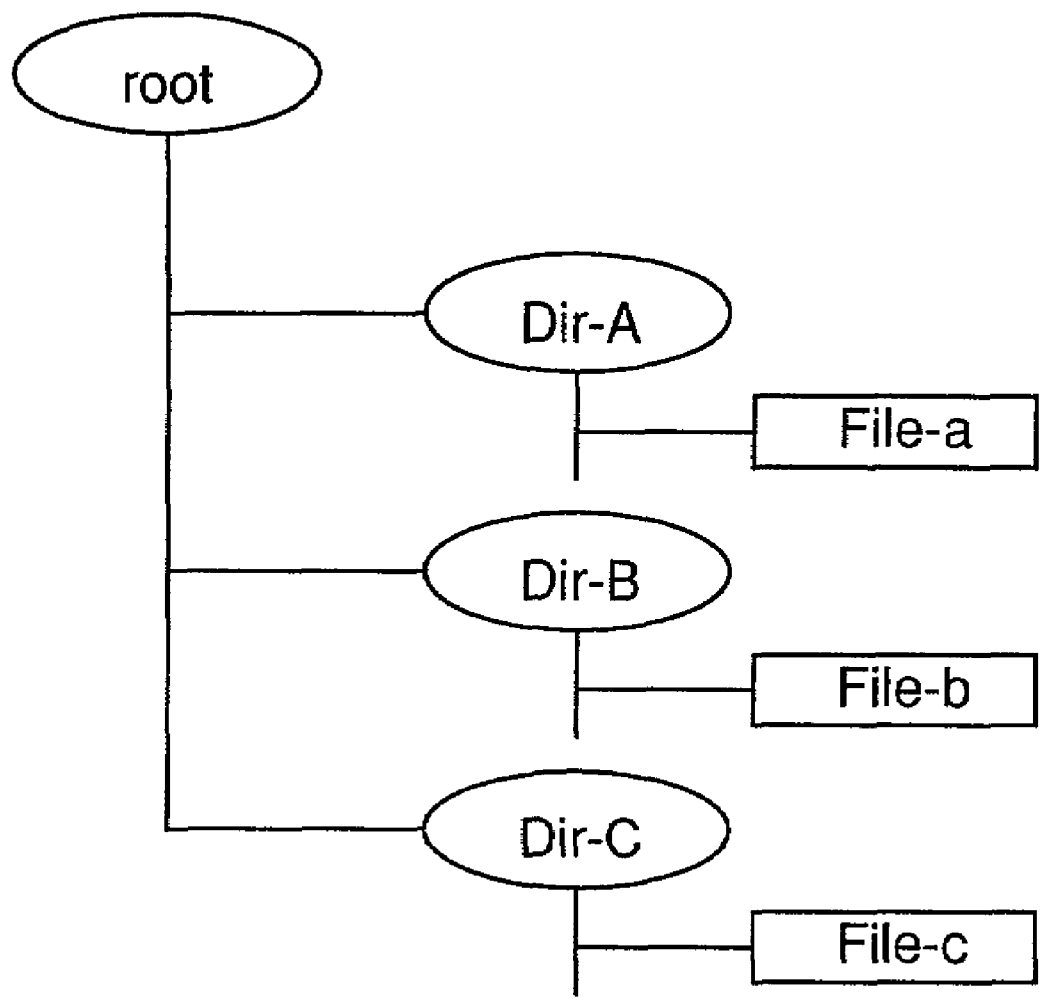
FIG. 13 is a diagram of a directory structure for managing files on disc.
Figure 14:
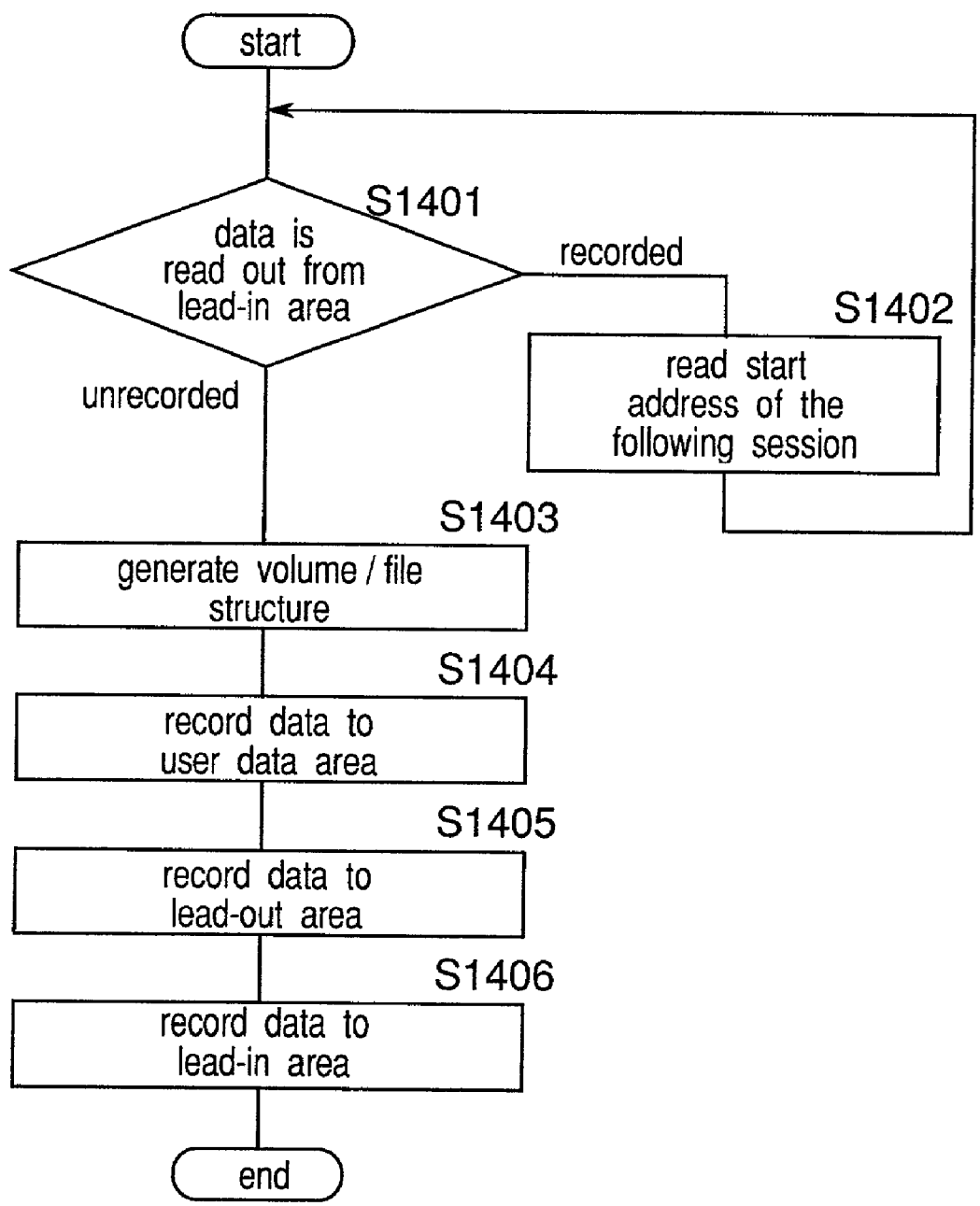
FIG. 14 is a flow chart of a multi-session data recording operation.

In the process for sequentially recording data file (File-a) and data file (File-b) according to the directory structure shown in FIG. 13, the chaining information area 115 to which the updated chaining information is recorded, file structure/file area 117 containing data file (File-a), chaining information area 119 recording the again-updated chaining information, file structure/file area 121 containing data file (File-b), and part of link extent 122, are recorded with link extent 114, link extent 116, link extent 118 and link extent 120 respectively therebetween.

In the closing process performed so that a read-only device that cannot detect location from an unrecorded area can detect the latest data structure, chaining information area 123 and overrun extent 124, which contains the open integrity information area 125 and close integrity information area 126 that are characteristic of the present invention, are formed in conjunction with link extent 122. The close integrity information area 107 for recording the logical volume integrity descriptor indicative of the close status characteristic of the present invention is formed in conjunction with link extent 106 and link extent 108.

The opening process for starting data recording again to a disk to which the closing process has been applied records a logical volume integrity descriptor indicating the volume is open to the unrecorded open integrity information area 125 in the overrun extent 124.

When a last data file (File-c) is additionally recorded based on the directory structure shown in FIG. 13, a chaining information area 127 recording the again-updated chaining information and file structure/file area 129 containing data file (File-c) are formed with link extent 128 therebetween.

The basic concept of the data structure of a data storage medium shown in FIG. 1 is described above. A more detailed data structure, including the data recording sequence, is further described below.

Figure 2:
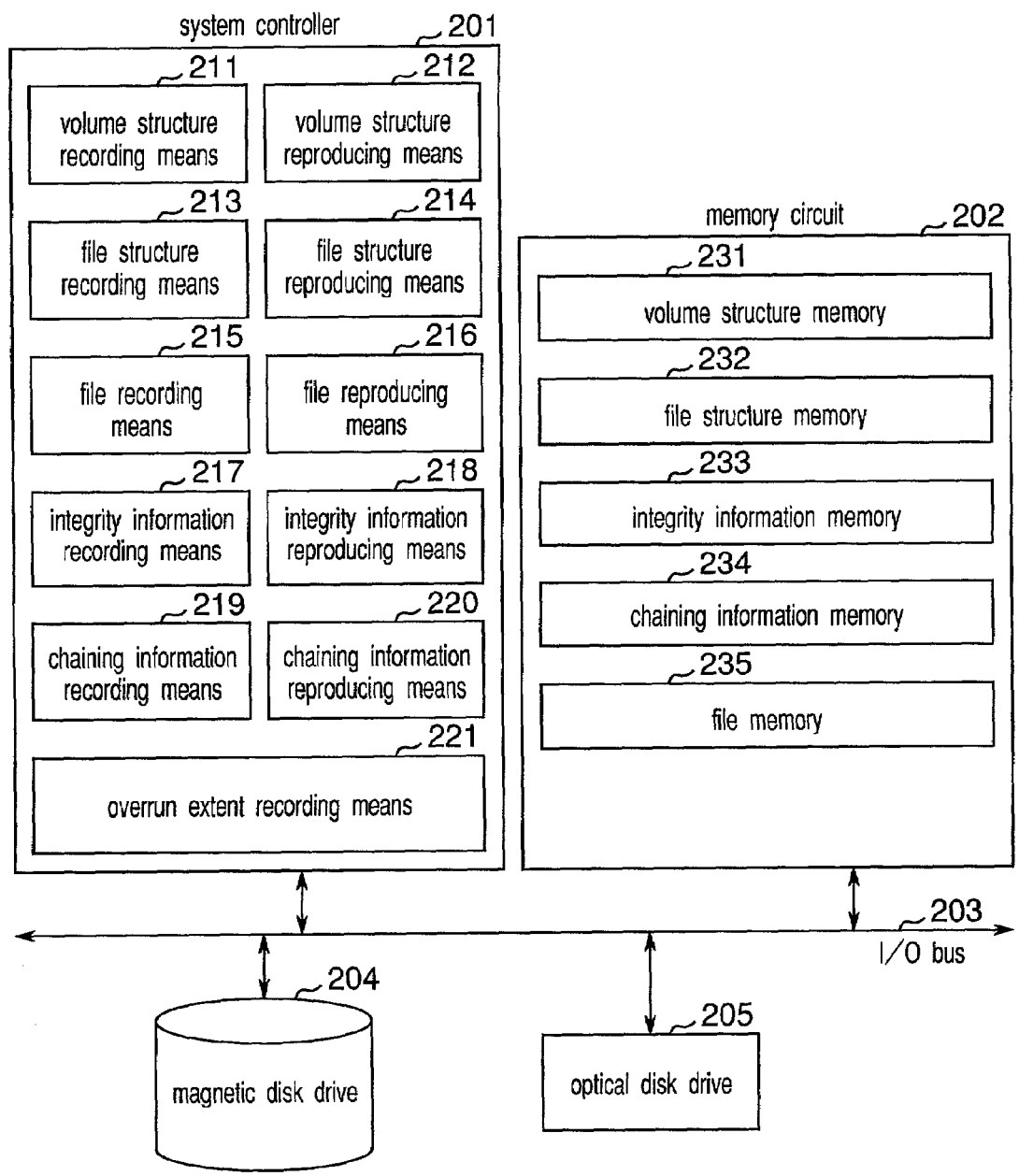
FIG. 2 is a block diagram of a data recording and reproducing apparatus according to a preferred embodiment of the present invention.

FIG. 2 is a block diagram of a data recording and reproducing apparatus according to a preferred embodiment of the present invention. As shown in FIG. 2, this data recording and reproducing apparatus comprises: a system controller 201, memory circuit 202, I/O bus 203, magnetic disk drive 204, and optical disk drive 205.

The system controller 201, which is achieved with a control program and a microprocessor containing operating memory, comprises: volume structure recording means 211 for recording the volume structure; a volume structure reproducing means 212 for reproducing the volume structure; a file structure recording means 213 for recording file structure; a file structure reproducing means 214 for reproducing file structure; a file recording means 215 for recording file data; a file reproducing means 216 for reproducing file data; a integrity information recording means 217 for recording integrity information containing a logical volume integrity descriptor indicative of an open status or close status; a integrity information reproducing means 218 for reproducing integrity information; chaining information recording means 219 for recording chaining information containing an unallocated space ICB and root directory ICB; chaining information reproducing means 220 for reproducing the chaining information; and overrun extent recording means 221 for recording an overrun extent containing an open integrity information area and close integrity information area.

The memory circuit 202 comprises volume structure memory 231 used for calculating and temporarily storing volume structure; file structure memory 232 used for calculating and temporarily storing file structure; integrity information memory 233 used for calculating and temporarily storing integrity information; chaining information memory 234 used for calculating and temporarily storing chaining information; and file memory 235 for temporarily storing a data file.

Figure 3:
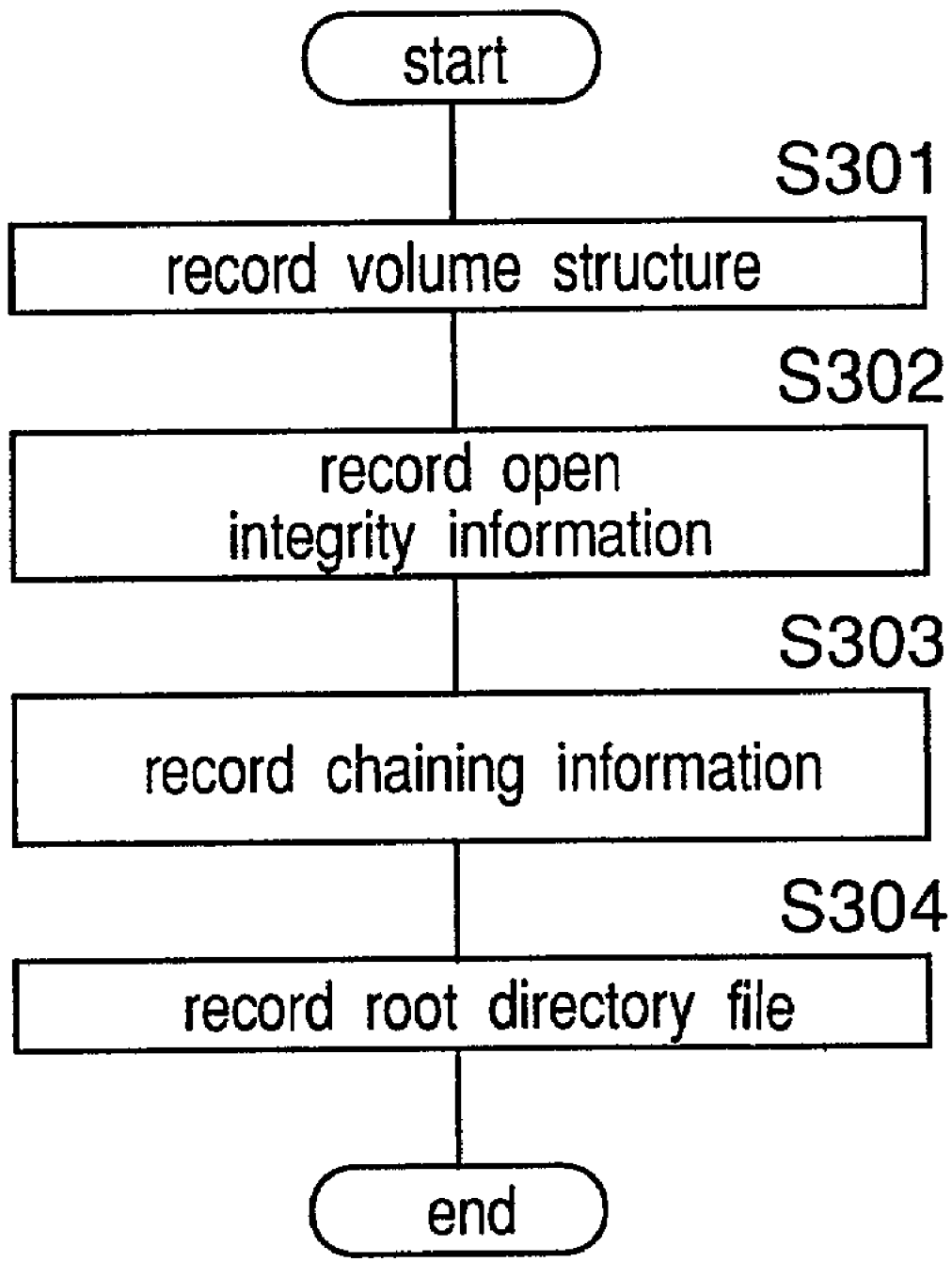
FIG. 3 is a flow chart describing a formatting process of a data recording and reproducing apparatus according to the present invention.

The formatting procedure for a data storage medium according to the present invention is described next below with reference to the block diagram in FIG. 2, the flow chart of the formatting process in FIG. 3, and a diagram of the data structure resulting from this formatting process shown in FIG. 4.

Figure 4:
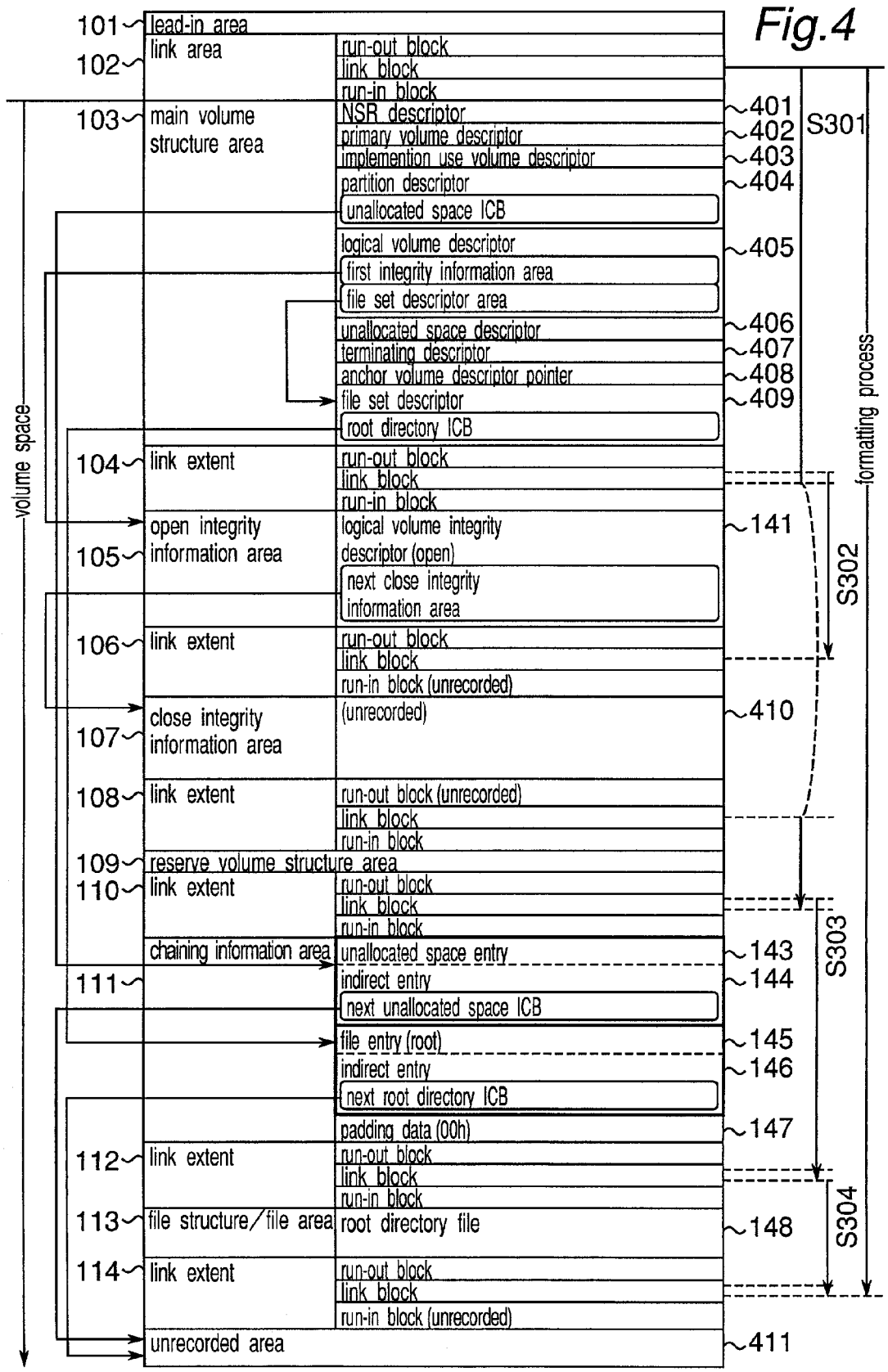
FIG. 4 is a data structure diagram of a formatted data storage medium.

(S301) Based on a control program stored internally as volume structure recording means 211, the system controller 201 generates volume structure in the volume structure memory 231 of memory circuit 202 according to the data structure sequence shown in FIG. 4; this volume structure is recorded twice, to main volume structure area 103 and reserve volume structure area 109, and comprises NSR descriptor 401, primary volume descriptor 402, Implementation use volume descriptor 403, partition descriptor 404, logical volume descriptor 405, unallocated space descriptor 406, terminating descriptor 407, anchor volume descriptor pointer 408, and file set descriptor 409.

An address for the unallocated space ICB that is recorded as part of the chaining information in step (S303) is contained in the partition descriptor 404 contained in the volume structure. In addition, the logical volume descriptor 405 contains the address of the logical volume integrity descriptor 141 first recorded in the volume space, and the address of the file set descriptor 409. Furthermore, the file set descriptor 409 contains the address of the root directory ICB that is part of the chaining information recorded in step (S303).

The system controller 201 then instructs the optical disk drive 205 to record the volume structure generated in the volume structure memory 231 according to this control program. In this recording command, the system controller 201 specifies the starting address of the reserve volume structure area 109 as the recording position of the reserve volume structure area with consideration given to the recording size of the open integrity information area 105, close integrity information area 107, fixed length link extent 104, link extent 106, link extent 108.

The optical disk drive 205 then internally generates recording data having a predefined link block/run-in block and run-out block/link block added before and after the volume structure transferred from the volume structure memory 231, and records the main volume structure continuously from the link block of link area 102, and the reserve volume structure continuously from the link block of link extent 108.

When recording the volume structure is completed, the optical disk drive 205 notifies the system controller 201 that recording has ended.

(S302) Next, following a program stored internally as the integrity information recording means 217, the system controller 201 generates open integrity information in the integrity information memory 233 of memory circuit 202. This open integrity information contains a logical volume integrity descriptor indicating that the logical volume is open.

It should be noted that the logical volume integrity descriptor contains an integrity type for distinguishing between a close status indicating that a data structure in the logical volume is a complete structure, and an open status indicating that a data structure in the logical volume is an incomplete structure because a data recording operation is in progress. Furthermore, a logical volume integrity descriptor indicating a close status is recorded immediately after recording a file or file structure in the logical volume is completed, and a logical volume integrity descriptor indicating an open status is recorded immediately before recording a file or file structure to a logical volume that is closed. The address of the area used for updating the logical volume integrity descriptor is also contained in the logical volume integrity descriptor. The data structure of this open integrity information is further described in detail below.

The system controller 201 then instructs the optical disk drive 205 to record the open integrity information generated in integrity information memory 233 according to this control program.

As in the recording operation for the volume structure, the optical disk drive 205 internally generates recording data having a predefined link block/run-in block and run-out block/link block added before and after the open integrity information transferred from the integrity information memory 233, and records the recording data continuously from the link block of link extent 104. This operation results in data being recorded twice to part of the link block because the above-noted recording of volume structure and this open integrity information recording operation overlap at the link block. This method of recording data bracketing a link area can be achieved using the control procedure as described above with reference to the related art.

When recording the open integrity information is completed, the optical disk drive 205 notifies the system controller 201 that recording has ended.

(S303) Next, following a program stored internally as the chaining information recording means 219, the system controller 201 generates chaining information in the chaining information memory 234 of the memory circuit 202.

The unallocated space ICB and root directory ICB that are characteristic of the present invention and contained in the chaining information are defined using the data structure of an ICB defined in ISO 13346.

An unallocated space ICB contains an unallocated space entry 143 for managing unallocated space in the volume space, and an indirect entry 144 with address of an unused area that is used for updating and recording the unallocated space ICB.

A root directory ICB contains a file entry 145 for a root directory file, and an indirect entry 146 with address of an unused area that is used for updating and recording the root directory ICB.

The data structure of this chaining information is further described in detail below, but it should be here noted that the various management information contained in the chaining information is identified using descriptor tags, and shall therefore not be limited to any particular recording order.

Furthermore, when the chaining information is recorded in ECC block units comprising a plurality of sectors, padding data 147 is added to the chaining information to fill invalid sectors in an ECC block.

Then, following this control program, the system controller 201 instructs the optical disk drive 205 to record the chaining information generated in the chaining information memory 234.

As in the recording operation for the volume structure, the optical disk drive 205 internally generates recording data having a predefined link block/run-in block and run-out block/link block added before and after the chaining information transferred from the chaining information memory 234, and records the recording data continuously from the link block of link extent 110. When recording the chaining information is completed, the optical disk drive 205 notifies the system controller 201 that recording has ended.

(S304) Next, following a program stored internally as the file structure recording means 213, the system controller 201 generates a root directory file in the file structure memory 232 of the memory circuit 202. Then, following this control program, the system controller 201 instructs the optical disk drive 205 to record the root directory file generated in the file structure memory 232.

As in the recording operation for the volume structure, the optical disk drive 205 internally generates recording data having a predefined link block/run-in block and run-out block/link block added before and after the root directory file transferred from the file structure memory 232, and records the recording data continuously from the link block of link extent 112. When recording the root directory file is completed, the optical disk drive 205 notifies the system controller 201 that recording has ended.

When the above-described formatting process is accomplished, a data structure as shown in FIG. 4 is formed on the data storage medium. It should be noted that the arrows S301 to S304 added to FIG. 4 indicate the area recorded in each step shown in FIG. 3.

It should be noted that the main volume structure area 103 and reserve volume structure area 109, the open integrity information area 105, chaining information area 111, and file structure/file area 113 have been described in the above formatting process as being separately recorded in conformance to the command unit processing sequence of a computer system. However, if a dedicated recording device that is not dependent upon the architecture of a computer system is used, it is also possible to perform all or part of these formatting steps continuously. For example, in a simplified formatting process in which recording operations for the main volume structure area 103 and reserve volume structure area 109, open integrity information area 105, chaining information area 111, and file structure/file area 113 are performed continuously while skipping the unrecorded close integrity information area 107, link extents 104, 110, and 112 shown in FIG. 4 do not exist.

In addition, an NSR descriptor 401 containing volume recognition information, primary volume descriptor 402 containing volume attributes information, implementation use volume descriptor 403 containing information for recognizing the implementation, partition descriptor 404 containing information about partitions inside the volume, logical volume descriptor 403 containing information for logical volume recognition, unallocated space descriptor 406 containing unallocated space management information, and a terminating descriptor 407 indicating the end of the descriptor set, are recorded in this preferred embodiment as the volume structure, and then a anchor volume descriptor pointer 408 indicating the starting point for the disk access operation, and file set descriptor 409 containing the address of the file set information and file entry for root directory, are recorded. The various management information contained in this volume structure is differentiated using descriptor tags, and the order in which it is recorded shall therefore not be specifically limited.

It should be noted that in ISO 13346 the file set descriptor is defined as part of the file structure, but in the formatted data structure shown in FIG. 4 according to this preferred embodiment, the file set descriptor 409 is recorded in the main volume structure area 103 as part of the volume structure to simplify the description.

A control procedure for a process for recording files to a data storage medium according to the present invention is described next with reference to the block diagram in FIG. 2, the diagram shown in FIG. 4 of a data structure resulting from the formatting process, the flow chart of this file recording process shown in FIG. 5, and the diagram shown in FIG. 6 of the data structure after file recording. It should be noted that in this file recording process data file (File-a) stored to magnetic disk drive 204 and data file (File-b) are described below as being separately recorded according to the directory structure shown in FIG. 13.

(S501) Following a control program stored internally as volume structure reproducing means 212, the system controller 201 instructs the optical disk drive 205 to read the anchor volume descriptor pointer 408 recorded to main volume structure area 103 and assigned at a specific logical sector number. The optical disk drive 205 reads and sends to the volume structure memory 231 of memory circuit 202 the anchor volume descriptor pointer 408 recorded to a specific area on the inserted disk (not shown in the figure).

Next, the system controller 201 interprets the address information of the main volume structure area 103 contained in the read anchor volume descriptor pointer 408, and instructs the optical disk drive 205 to perform a data read operation from main volume structure area 103. The optical disk drive 205 thus reads and transfers to the volume structure memory 231 of memory circuit 202 sequentially from NSR descriptor 401, the primary volume descriptor 402, implementation use volume descriptor 403, partition descriptor 404, logical volume descriptor 405, unallocated space descriptor 406, terminating descriptor 407, and file set descriptor 409.

In addition, the system controller 201 interprets the read partition descriptor 404, logical volume descriptor 405, and file set descriptor 409 to obtain the address information for the unallocated space ICB, file set descriptor, and root directory ICB. It should be noted that if the main volume structure area 103 cannot be reproduced, the volume structure is reproduced from the reserve volume structure area 109.

(S502) Following a control program stored internally as chaining information reproducing means 220, the system controller 201 instructs the optical disk drive 205 to reproduce from the following chaining information area using the address obtained from step (S501) or the following step (S503). The optical disk drive 205 then tries to reproduce data from the specified chaining information area. If data is reproduced from the specified chaining information area, the optical disk drive 205 transfers the reproduced chaining information to the chaining information memory 234 of memory circuit 202. The system controller 201 then performs step (S503) to retrieve the updated chaining information.

If data reproduction is not possible because the specified chaining information area is unrecorded, the system controller 201 decides that the data reproduced last is the latest chaining information, and operation continues from step (S504).

For example, the information read from chaining information area 111 is the latest chaining information if the data storage medium has only been formatted as shown in FIG. 4. This chaining information contains unallocated space entry 143 for managing unallocated areas within the volume space as part of the unallocated space ICB, and file entry 145 of the root directory file for managing root directory file 148 as part of the root directory ICB, and this management information is used in the subsequent process.

(S503) Following a control program stored internally as chaining information reproducing means 220, the system controller 201 obtains the unallocated space ICB and root directory ICB recorded to the following chaining information area from the unallocated space ICB and root directory ICB indirect entries.

For example, if the data storage medium has only been formatted as shown in FIG. 4, the address of the next unallocated space ICB is detected using the indirect entry 144 to the unallocated space ICB read from chaining information area 111, and the address of the next root directory ICB is detected using the indirect entry 146 to the root directory ICB. The structure of these indirect entries is further described in detail below.

(S504) Following a control program stored internally as file structure reproducing means 214, the system controller 201 detects the address of the root directory file from the file entry for the root directory file contained in the chaining information read in step (S502).

For example, if the data storage medium has only been formatted as shown in FIG. 4, the address of root directory file 148 is obtained from the file entry 145 for the root directory file read from chaining information area 111.

Next, the system controller 201 instructs the optical disk drive 205 to reproduce the root directory file from the file structure/file area using the obtained root directory file address. The optical disk drive 205 reads the latest root directory file from the file structure/file area and transfers it to the file structure memory 232 of memory circuit 202. For example, if the data storage medium has only been formatted as shown in FIG. 4, the root directory file 148 recorded to file structure/file area 113 is sent.

When this root directory file reproducing operation ends, the optical disk drive 205 notifies the system controller 201 that reproduction is completed.

(S505) Following a control program stored internally as file recording means 215, the system controller 201 reads data file (File-a) to be recorded to the data storage medium from magnetic disk drive 204, and transfers it to file memory 235 of memory circuit 202. In addition, the system controller 201 generates a directory file (Dir-A) for managing data file (File-a) 149, and file entry (File-a) 150 and file entry (Dir-A) 151 for managing these files, and updates the content of the root directory file read into file structure memory 232 in step (S504). Then, with the directory file and file entry, and data file (File-a), stored to file structure memory 232, the system controller 201 instructs the optical disk drive 205 to record this data according to a control program stored internally as file structure recording means 213 and file recording means 215.

The system controller 201 specifies the start address of the file structure/file area 117 for recording the data file and file structure in this recording command based on the recording size of the fixed length link extent 114, chaining information area 115, and link extent 116 recorded immediately after file structure/file area 113.

This specified address of an unrecorded area is obtained from the latest unallocated space entry detected in step (S502) as noted above.

The optical disk drive 205 internally generates recording data having a predefined link block/run-in block and run-out block/link block appended before and after the file structure/file information comprising the file entry and directory file sent from file structure memory 232, and data file (File-a) sent from file memory 235, and then records continuously from the link block of the link extent 116.

When this recording operation to the file structure/file area 117 ends, the optical disk drive 205 notifies the system controller 201 that recording is completed.

Figure 6:
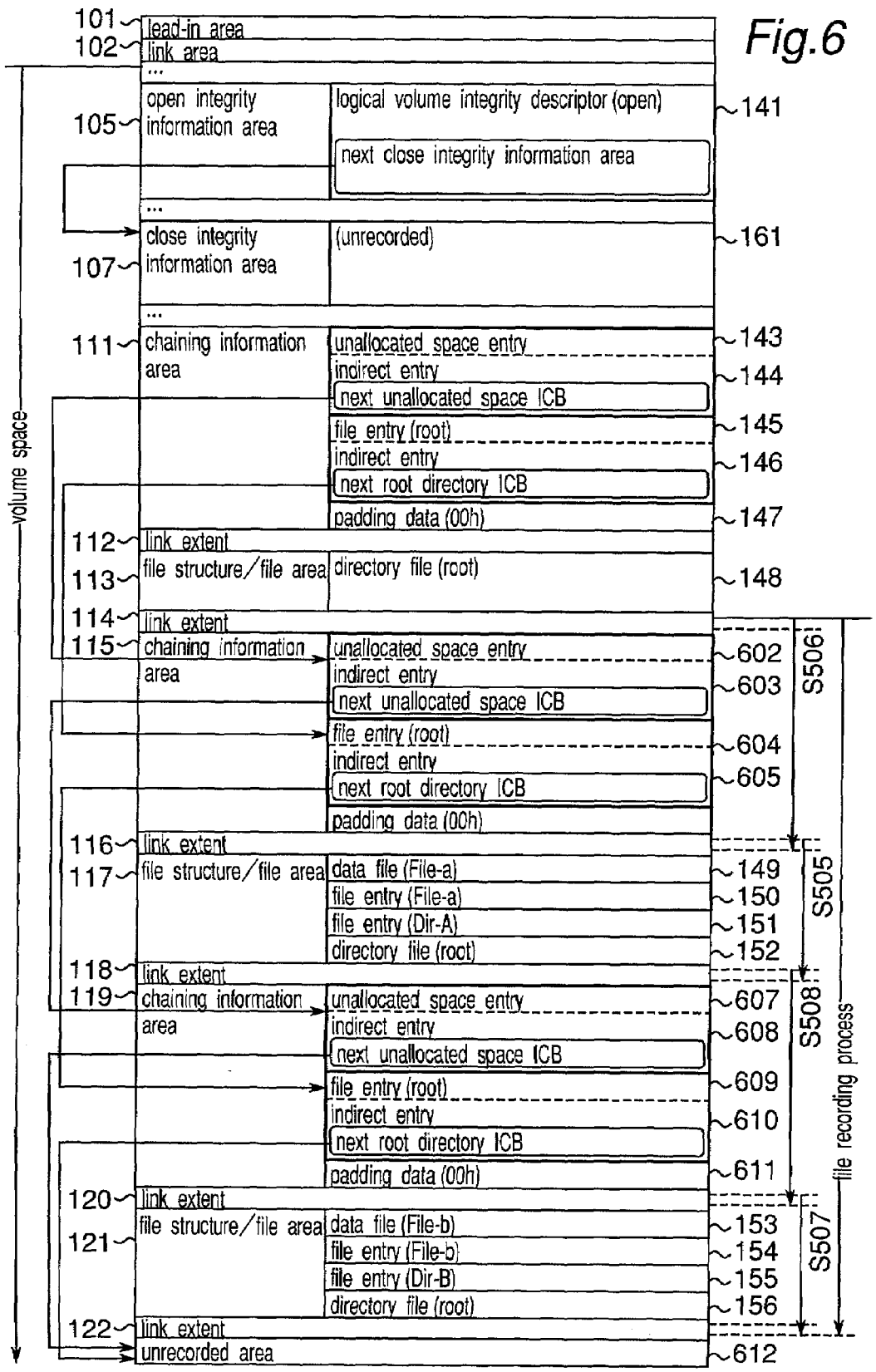
FIG. 6 is a data structure diagram of a data storage medium after the file recording process.

When the data recording operation described above ends, data file (File-a) 149 and a file entry 150 for managing it, file entry 151 for managing directory file (Dir-A), and root directory file 152 are formed in the file structure/file area 117 as shown in FIG. 6. It should be noted that in this preferred embodiment directory file (Dir-A) is recorded embedded in the file entry 151 for managing this directory, and the directory file itself is therefore not written.

(S506) Following a control program stored internally as chaining information recording means 219, the system controller 201 temporarily stores chaining information to chaining information memory 234. The stored chaining information includes a root directory ICB containing the address of the root directory file recorded in step (S505), and an unallocated space ICB with the address of an unallocated area. The system controller 201 then instructs the optical disk drive 205 to record the chaining information stored to chaining information memory 234.

It should be noted that in this recording operation command the system controller 201 specifies the address specified by the indirect entry 144 of the unallocated space ICB recorded in step (S303) of the formatting process as the start address of the chaining information area. As part of the recording operation, the optical disk drive 205 internally generates recording data having a predefined link block/run-in block and run-out block/link block appended before and after the chaining information, and records continuously from link extent 114.

(S507) To additionally record a new data file (File-b) using the same control procedure as step (S505), the system controller 201 generates data file (File-b) and updated file structure in file memory 235 and file structure memory 232 of memory circuit 202, and then instructs the optical disk drive 205 to record. The optical disk drive 205 thus records this file structure/file information continuously from the link block of link extent 120.

(S508) Using the same control procedure as in step (S506), the system controller 201 generates updated chaining information in chaining information memory 234 of memory circuit 202, and then instructs the optical disk drive 205 to record this chaining information. The optical disk drive 205 continuously records this chaining information from the link block of link extent 118.

A data structure as shown in FIG. 6 is formed on the data storage medium by performing the file recording process described above. It should be noted that the arrows S505 to S508 added to FIG. 6 indicate the area recorded in each step shown in FIG. 5.

Furthermore, the data file, directory file, and file entries for managing these are described as being recorded at once in step (S505) and step (S507), but these files and file entries can be recorded separately. When separately recorded, a link block/run-in block and run-out block/link block are recorded before and after the file or file entry, and a link extent is thus formed between file and file entry. In addition, the recording location of the data file and directory file recorded to file structure/file area 117 or file structure/file area 121, and a file entry for managing the same, is logically managed based on the file structure, and the recording sequence of the data file or directory file and the file entry for managing the same shall therefore not be limited to that shown in the data structure diagram in FIG. 6.

It should be noted that data reliability can be improved by re-reading recorded data, including the file structure, after recording a file, and then recording the file once again if the data cannot be reproduced.

It should be further noted that the file recording process for data file (File-a) in step (S505), and the file recording process for data file (File-b) in step (S507), can be performed on different recording devices.

A control procedure for a data storage medium closing process according to a preferred embodiment of the present invention is described next below with reference to the block diagram in FIG. 2, the diagram shown in FIG. 6 of the data structure after file recording, the flow chart of this closing process shown in FIG. 7, and the diagram shown in FIG. 8 of the data structure after this closing process is completed.

(S701) As in step (S501) of the above described file recording process, the system controller 201 interprets the volume structure read from the main volume structure area 103 or reserve volume structure area 109, and obtains the address of the unallocated space ICB that is part of the first chaining information from the partition descriptor 404, the address of the logical volume integrity descriptor recorded to the open integrity information area 105 that is the first integrity information from the logical volume descriptor 405, and the address of the root directory ICB that is part of the first chaining information from the file set descriptor 409.

(S702) Following a control program stored internally as volume integrity information reproducing means 218, the system controller 201 instructs the optical disk drive 205 to reproduce the integrity information area using the address obtained in step (S701) or the following step (S703). The optical disk drive 205 then attempts data reproduction from the specified integrity information area. If data is reproduced from the specified integrity information area, the optical disk drive 205 sends the reproduced integrity information to the integrity information memory 233 in memory circuit 202. The system controller 201 then performs step (S703) to retrieve the updated integrity information.

If data reproduction fails because the specified integrity information area is unrecorded, the system controller 201 determines that the last reproduced information is the latest integrity information, and proceeds from step (S704).

For example, if the data storage medium has recorded thereto data file (File-a), data file (File-b), and the corresponding file structure as shown in FIG. 6, the logical volume integrity descriptor (open) 141 recorded to open integrity information area 105 is the latest integrity information. This integrity information is described in detail below.

(S703) Following a control program stored internally as integrity information reproducing means 218, the system controller 201 obtains the address of the following integrity information area from the logical volume integrity descriptor contained in the integrity information read in step (S702).

For example, if the data storage medium has recorded thereto data file (File-a), data file (File-b), and the corresponding file structure as shown in FIG. 6, the address of the following close integrity information area is obtained from the logical volume integrity descriptor (open) 141 read from open integrity information area 105.

(S704) As in step (S502) of the above described file recording process, the system controller 201 instructs the optical disk drive 205 to reproduce from the chaining information area using the address obtained in step (S701) or the following step (S705). The optical disk drive 205 then attempts data reproduction from the specified chaining information area. If data is reproduced from the specified chaining information area, the optical disk drive 205 sends the reproduced chaining information to the chaining information memory 234 in memory circuit 202. The system controller 201 then performs step (S705) to retrieve the updated chaining information.

If data reproduction fails because the specified chaining information area is unrecorded, the system controller 201 determines that the last reproduced information is the latest chaining information, and proceeds from step (S706).

For example, if the data storage medium has recorded thereto data file (File-a), data file (File-b), and the corresponding file structure as shown in FIG. 6, the information read from chaining information area 119 is the latest chaining information. This chaining information contains unallocated space entry 607 for managing unallocated area in the volume space as part of the unallocated space ICB, and file entry 609 of the root directory file for managing root directory file 156 as part of the root directory ICB, and is used in the following steps.

(S705) Following a control program stored internally as chaining information reproducing means 220 as in step (S503) of the above described file recording process, the system controller 201 detects the address of the next chaining information area from the indirect entry contained in the chaining information read in step (S704).

For example, if the data storage medium has recorded thereto data file (File-a), data file (File-b), and the corresponding file structure as shown in FIG. 6, the address of the following unallocated space ICB is obtained using the indirect entry 608 of the unallocated space ICB read from chaining information area 119, and the address of the following root directory ICB is obtained using indirect entry 610 of the root directory ICB.

(S706) Following a control program stored internally as file structure reproducing means 214 as in step (S504) of the above described file recording process, the system controller 201 detects the address of root directory file 156 from the file entry of the root directory file contained in the chaining information read in step (S704), and instructs the optical disk drive 205 to reproduce this root directory file 156.

The optical disk drive 205 thus reads this root directory file 156 and sends it to the file structure memory 232 of memory circuit 202. The system controller obtains the address of file entry 151 for directory file (Dir-A) and the address of file entry 155 for directory file (Dir-B) recorded to the read root directory file 156, and again instructs the optical disk drive 205 to read these directory files.

Thus starting from root directory file 156, the system controller 201 and optical disc drive 205 sequentially reproduce as follows; the file entry 151 for directory file (Dir-A), the directory file (Dir-A) recorded in this file entry, the file entry 150 for data file (File-a), the file entry 155 for directory file (Dir-B), the directory file (Dir-B) recorded in this file entry and the file entry 154 for data file (File-b).

For example, if the data storage medium has recorded thereto data file (File-a), data file (File-b), and the corresponding file structure as shown in FIG. 6, the address of root directory file 156 is obtained from file entry 609 of the root directory file part of the root directory ICB of chaining information area 119. Then, the addresses of directory file (Dir-A) file entry 151 and directory file (Dir-B) file entry 155 are obtained from root directory file 156. Moreover, the address of data file (File-a) file entry 150 is obtained from the directory file (Dir-A) recorded to directory file (Dir-A) file entry 151, and the address of data file (File-b) file entry 154 is obtained from directory file (Dir-B) recorded to directory file (Dir-B) file entry 155. Finally, data file (File-a) file entry 150 and data file (File-b) file entry 154 are read.

When this file structure reproducing operation ends, the optical disk drive 205 notifies the system controller 201 that reproduction is over.

(S707) As in steps (S506) and (S508) of the above described file recording process, the system controller 201 temporarily stores chaining information to the chaining information memory 234.

In this case, however, the address of the root directory file read in step (S706) and the address of the following chaining information are also stored, the system controller 201 internally generates recording data having a predefined link block/run-in block and link block/run-out block appended before and after the chaining information, and continuously records from link extent 122 at the address specified by indirect entry 607 of unallocated space ICB in the chaining information recorded in step (S508).

(S708) Following a control program stored internally as overrun extent recording means 221, the system controller 201 instructs the optical disk drive 205 to record an overrun extent.

An overrun extent 124 is formed by a plurality of overrun block recordings. An unrecorded open integrity information area and close integrity information area are allocated before and after an overrun area comprising overrun blocks having appended thereto a predefined run-out block/link block and link block/run-in block by the optical disk drive 205.

The overrun extent is thus formed by recording an overrun block to an area located before and after a unrecorded open integrity information area and close integrity information area allocated for recording updated close integrity information and open integrity information.

When recording the overrun extent is completed, the optical disk drive 205 notifies the system controller 201 that recording is finished.

(S709) Following a control program stored internally as integrity information recording means 217, the system controller 201 temporarily stores the close integrity information to integrity information memory 233.

Next, the system controller 201 instructs the optical disk drive 205 to record the close integrity information generated in integrity information memory 233. For this recording command the system controller 201 internally generates recording data having a predefined link block/run-in block and run-out block/link block appended before and after the close integrity information, and records logical volume integrity descriptor (close) 142 to close integrity information area 107 from the following integrity information area specified by the latest integrity information obtained in step (S703).

Figure 8:
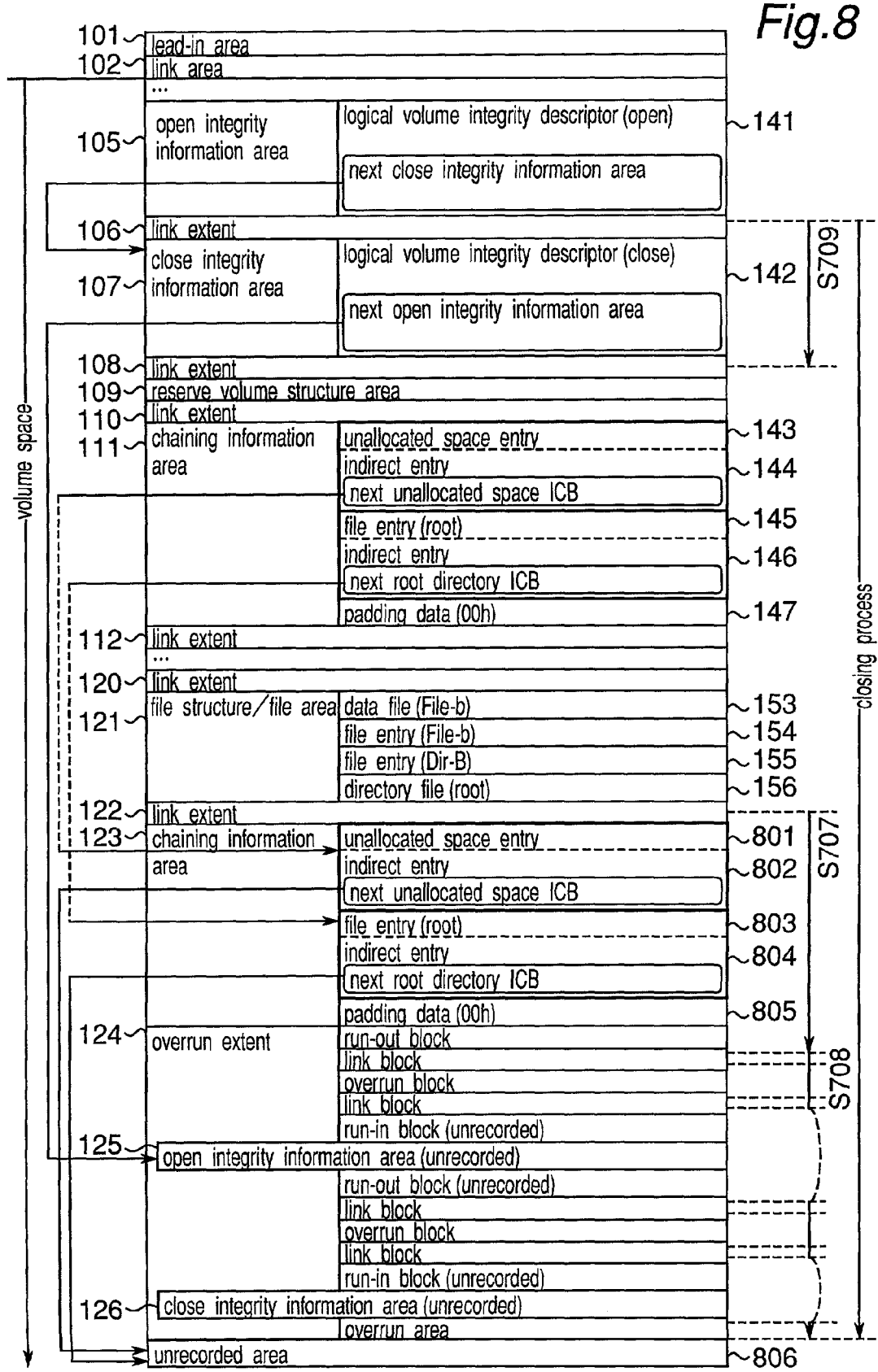
FIG. 8 is a data structure diagram of a data storage medium after the closing process is completed.

The data structure shown in FIG. 8 is formed on the data storage medium by performing the above described closing process. It should be noted that the arrows S708 to S709 added to FIG. 8 indicate the area recorded in each step shown in FIG. 7.

It should be noted that the chaining information recorded in step (S707) and the overrun extent recorded in step (S708) can be recorded at once. In this case, the run-out block and link block at the beginning of overrun extent 124 are not recorded.

It should be further noted that when an area that should be recorded in an overrun extent is determined to not be recorded, the last read integrity information is determined to be the latest, but this shall not be limited to detection of an unrecorded area.

Furthermore, similarly to the lead-out area described in the related art, an overrun extent is an area that is recorded to prevent overruns into unrecorded area 806 when a read-only disk drive without the ability to detect addresses from unrecorded areas accesses the unrecorded open integrity information area 125. It is also possible to prevent servo errors and misoperation when a read-only disk drive accesses an unrecorded area 125 because unrecorded area 125 covers a plurality of tracks and has a recorded area formed before and after it. It should be further noted that the overrun extent is added before and after an unrecorded area for dummy data access so as to prevent servo errors when a read-only disk drive accesses an unrecorded area as noted above, and the size of the overrun extent must therefore be sufficient to achieve this purpose.

Furthermore, considering the possibility of read errors, the same logical volume integrity descriptor as the logical volume integrity descriptor recorded to the integrity information area can be plurally recorded to one or more ECC blocks. It should be noted that this closing process is performed when the latest integrity information is open integrity information, and the closing process need not be performed again when the latest integrity information is close integrity information.

Figure 10:
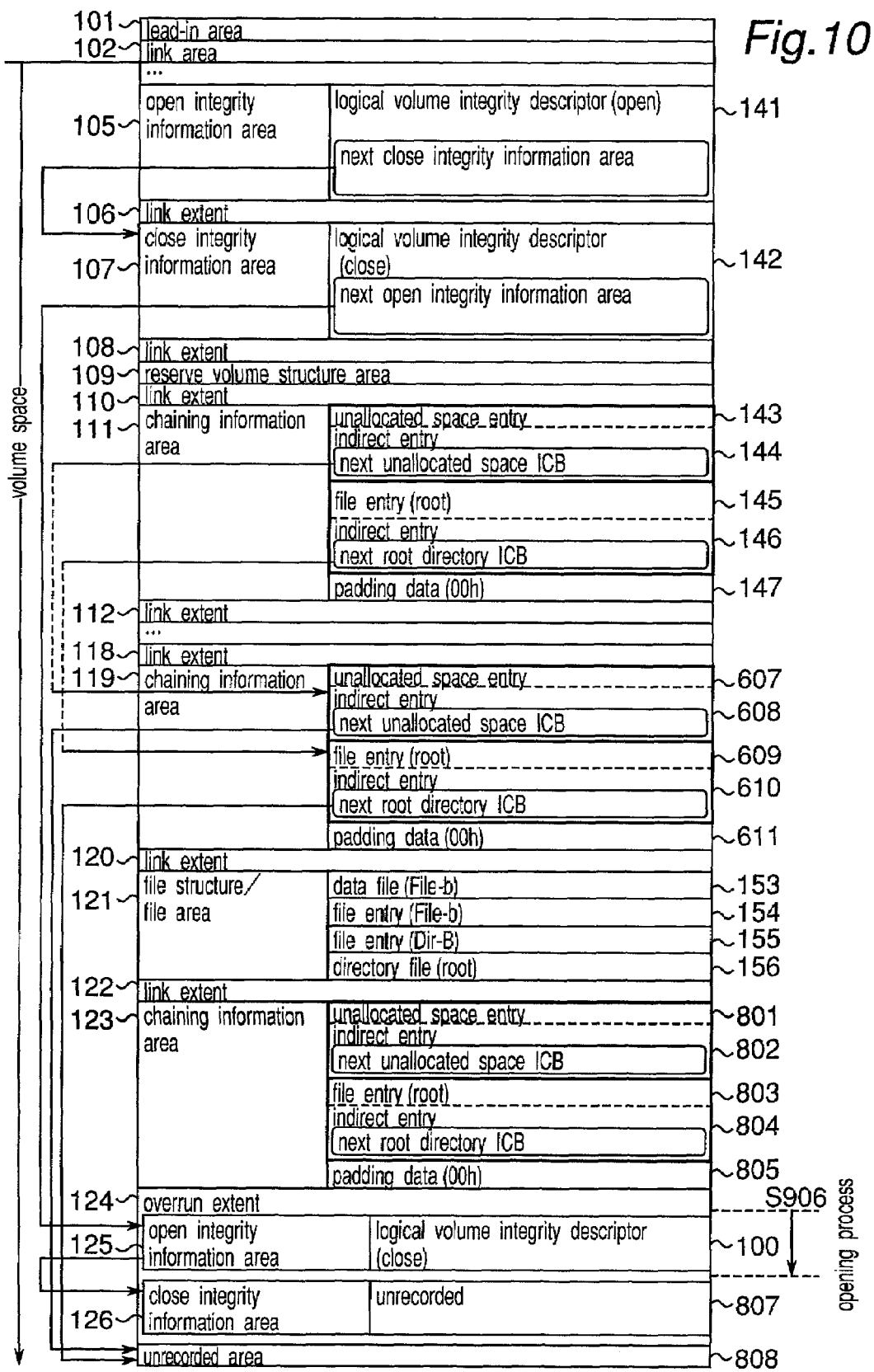
FIG. 10 is a data structure diagram of a data storage medium after the opening process is completed.

A control procedure for an opening process to start recording to a data storage medium according to the present invention is described next with reference to the block diagram in FIG. 2, the data structure diagram after the closing process shown in FIG. 8, the flow chart of this opening process shown in FIG. 9, and the data structure diagram after this opening process as shown in FIG. 10.

(S901) As in step (S501) of the above described file recording process, the system controller 201 interprets the volume structure read from the main volume structure area 103 or reserve volume structure area 109, and obtains the address of the logical volume integrity descriptor recorded to open integrity information area 105, that is, the first integrity information, and the address of the unallocated space ICB and root directory ICB recorded to chaining information area 111 as the first chaining information.

(S902) Next, as in step (S702) of the above described closing process, the system controller 201 instructs the optical disk drive 205 to reproduce the integrity information area using the address obtained in step (S901) or the following step (S903) according to a program stored internally as integrity information reproducing means 218. The optical disk drive 205 then attempts to reproduce data from the specified integrity information area. If data is reproduced from the specified integrity information area, the optical disk drive 205 sends the reproduced integrity information to the integrity information memory 233 in memory circuit 202. The system controller 201 then performs step (S903) to retrieve the updated integrity information.

If data reproduction fails because the specified integrity information area is unrecorded, the system controller 201 determines that the last reproduced information is the latest integrity information, and proceeds from step (S904).

For example, if the data storage medium is formatted as shown in FIG. 8 as a result of a closing process being completed, the logical volume integrity descriptor (close) 142 recorded to close integrity information area 107 is the latest integrity information.

(S903) Next, as in step (S703) of the above described closing process, the system controller 201 obtains the address of the following integrity information area contained in the integrity information read in step (S902) following a control program stored internally as integrity information reproducing means 218.

(S904) As in step (S502) of the above described file recording process, the system controller 201 instructs the optical disk drive 205 to reproduce from the chaining information area using the address obtained in step (S901) or the following step (S905). The optical disk drive 205 then attempts data reproduction from the specified chaining information area. If data is reproduced from the specified chaining information area, the optical disk drive 205 sends the reproduced chaining information to the chaining information memory 234 in memory circuit 202. The system controller 201 then performs step (S705) to retrieve the updated chaining information.

If data reproduction fails because the specified chaining information area is unrecorded, the system controller 201 determines that the last reproduced information is the latest chaining information, and proceeds from step (S706).

For example, if the data storage medium is formatted as shown in FIG. 8 as a result of a closing process being completed, the information read from chaining information area 123 is the latest chaining information. This chaining information contains unallocated space entry 801 for managing an unallocated area within the volume space as part of the unallocated space ICB, and root directory file entry 803 for managing root directory file 156 as part of the root directory ICB, and is used in the following steps.

(S905) As in step (S503) of the above described file recording process, the system controller 201 detects the address of the following chaining information area from the indirect entry contained in the chaining information read in step (S904) following a control program stored internally as chaining information reproducing means 220.

For example, if the data storage medium is formatted as shown in FIG. 8 as a result of a closing process being completed, the address of the following unallocated space ICB is detected using the indirect entry 802 of the unallocated space ICB read from chaining information area 123, and the address of the following root directory ICB is detected using the indirect entry 804 of the root directory ICB.

(S906) Following a control program stored internally as integrity information recording means 217, the system controller 201 temporarily stores open integrity information to integrity information memory 233. Next, the system controller 201 instructs the optical disk drive 205 to record the open integrity information generated in integrity information memory 233.

In commanding this recording operation, the system controller 201 internally generates recording data by adding a predefined link block/run-in block and link block/run-out block units before and after the open integrity information, and records the logical volume integrity descriptor (open) to the open integrity information area 125 from the address of the following integrity information area specified by the latest integrity information obtained in step (S903).

When a opening process as described above is accomplished, a data structure as shown in FIG. 10 is formed on the data storage medium. It should be noted that arrow S906 added to FIG. 10 indicates the area recorded in that step shown in FIG. 9.

It should be noted that the same logical volume integrity descriptor recorded to the integrity information area can be recorded a plurality of times to one or more ECC blocks in consideration of read errors. It should be noted that this opening process is performed when the latest integrity information is close integrity information, and the opening process need not be performed again when the latest integrity information is open integrity information.

When the file recording operation shown in FIG. 5 is again performed to append to a data storage medium formatted with a data structure as shown in FIG. 10 and described above a data file (File-c) and file structure according to the directory structure shown in FIG. 13, a data structure as shown in FIG. 1 is formed on the data storage medium.

The data structure of open integrity information and close integrity information characteristic of integrity information according to the present invention is described in detail next below with reference to FIG. 1. This integrity information is recorded in step (S302) of the formatting process shown in FIG. 3, step (S709) of the closing process shown in FIG. 7, and step (S906) of the opening process shown in FIG. 9.

Open integrity information and close integrity information is differentiated by the integrity type of the logical volume integrity descriptor. As for the detailed data structure of the logical volume integrity descriptors, a descriptor tag 181 identifying the descriptor as a logical volume integrity descriptor, an integrity type (open) 182 identifying the descriptor as an open integrity descriptor, and the address 183 of the next close integrity information area, are recorded in the logical volume integrity descriptor (open) 141 recorded to open integrity information area 105 in FIG. 1.

In addition, a descriptor tag 184 identifying the descriptor as a logical volume integrity descriptor, an integrity type (close) 185 identifying the descriptor as a close integrity descriptor, and the address 186 of the next open integrity information area, are recorded in the logical volume integrity descriptor (close) 142 recorded to the close integrity information area 107 shown in FIG. 1.

Open integrity information is thus a logical volume integrity descriptor of which the integrity type is indicative of an open status, and close integrity information is a logical volume integrity descriptor of which the integrity type is indicative of a close status. Because the address of the next logical volume integrity descriptor is recorded to the logical volume integrity descriptor recorded to each integrity information area, successive logical volume integrity descriptors can be read as a chaining of information.

Open integrity information is recorded before user data recording begins, and thus indicates that recording is in progress. Close integrity information is recorded after user data recording is completed, and thus assures consistency between the recorded file(s) and file management information. This integrity information thus assures consistency between files and file management information recorded to a disk. For a read-only disk drive that does not have the ability to detect location in a unrecorded disk area, this integrity information can be used to detect if data is recorded to the disk beyond the overrun extent for preventing reading from unrecorded disk areas.

The data structure of chaining information that is another characteristic of the present invention is described next in detail below with reference to FIG. 1. Chaining information is recorded in step (S303) of the formatting process shown in FIG. 3, steps (S506) and (S508) of the file recording process shown in FIG. 5, and step (S707) of the closing process shown in FIG. 7. As described with reference to step (S303), this chaining information has an ICB structure using the ICB strategy 4096 defined as one implementation of ISO 13346. Chaining information in the present embodiment comprises an unallocated space ICB containing unallocated space entry 143 and indirect entry 144 for managing unallocated space, root directory ICB containing file entry 145 and indirect entry 146 of the root directory file, and padding data 147.

Descriptor tag 187 for identifying the descriptor as an unallocated space entry, and allocation descriptor 188 for managing unallocated area addresses, are recorded to the unallocated space entry 143 part of the unallocated space ICB. In addition, descriptor tag 189 for identifying the descriptor as an indirect entry, and address 190 for the next unallocated space ICB, are recorded to the indirect entry 144 of the unallocated space ICB.

Furthermore, descriptor tag 191 for identifying the descriptor as a file entry, and allocation descriptor 192 for root directory file address management, are recorded to the root directory file entry 145 part of the root directory ICB. In addition, descriptor tag 193 for identifying the descriptor as an indirect entry, and address 194 for the next root directory ICB, are recorded in the indirect entry 146 part of the root directory ICB.

By recording the addresses for the next unallocated space ICB and root directory ICB to the indirect entry of the unallocated space ICB and root directory ICB in the chaining information, these ICBs can be read in a chaining. The unallocated space entry part of the unallocated space ICB determined to be the latest specifies the latest unallocated area, and the root directory file entry part of the root directory ICB specifies the latest root directory.

The unallocated area address recorded to the allocation descriptor of the latest unallocated space entry is simultaneously the address from which file structure/file information recording starts.

When the data storage medium uses a physical format in which data is recorded in ECC block units with error correction code added for a plurality of sectors, padding data 147 is recorded to the data storage medium after forming ECC blocks by adding padding data to valid data.

All data files can be retrieved and recorded using only the volume structure and file structure recorded within the volume space with the file recording process, opening process, and closing process of the present invention. A READ TOC command or other special command for accessing a lead-in area is therefore not necessary because TOC data recorded to a lead-in area to which a logical sector number is not assigned as described in the related art above does not need to be read as part of the file retrieval information. It is therefore possible to simplify the architecture of software for managing the file system of such data storage media, or controlling the optical disk drive interface, in a personal computer system because all areas within the volume structure can be recorded using only the WRITE command used for data recording operations in the volume space.

Figure 11:
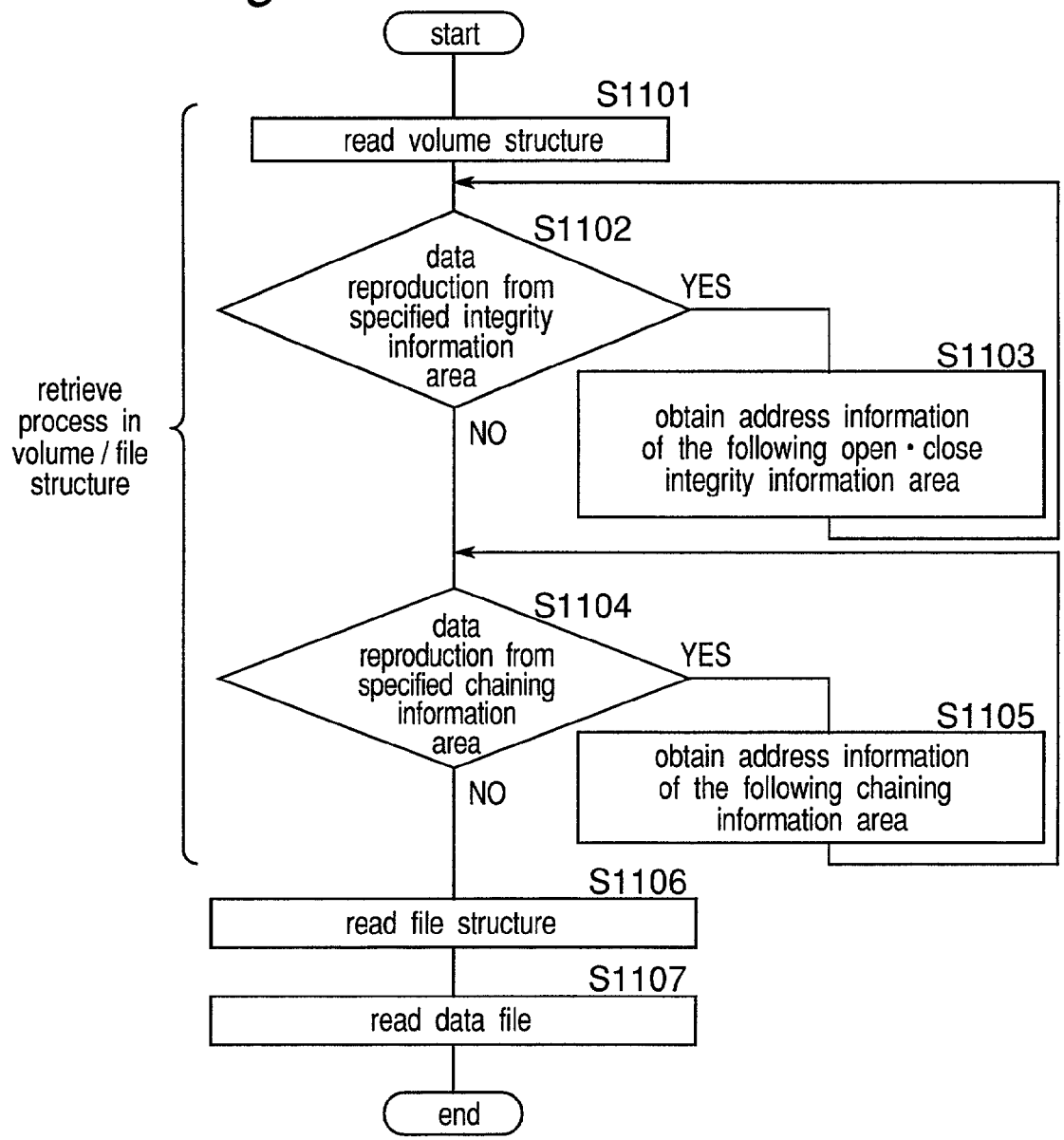
FIG. 11 is a flow chart describing a file reproduction process of a data recording and reproducing apparatus according to the present invention.
Figure 12:
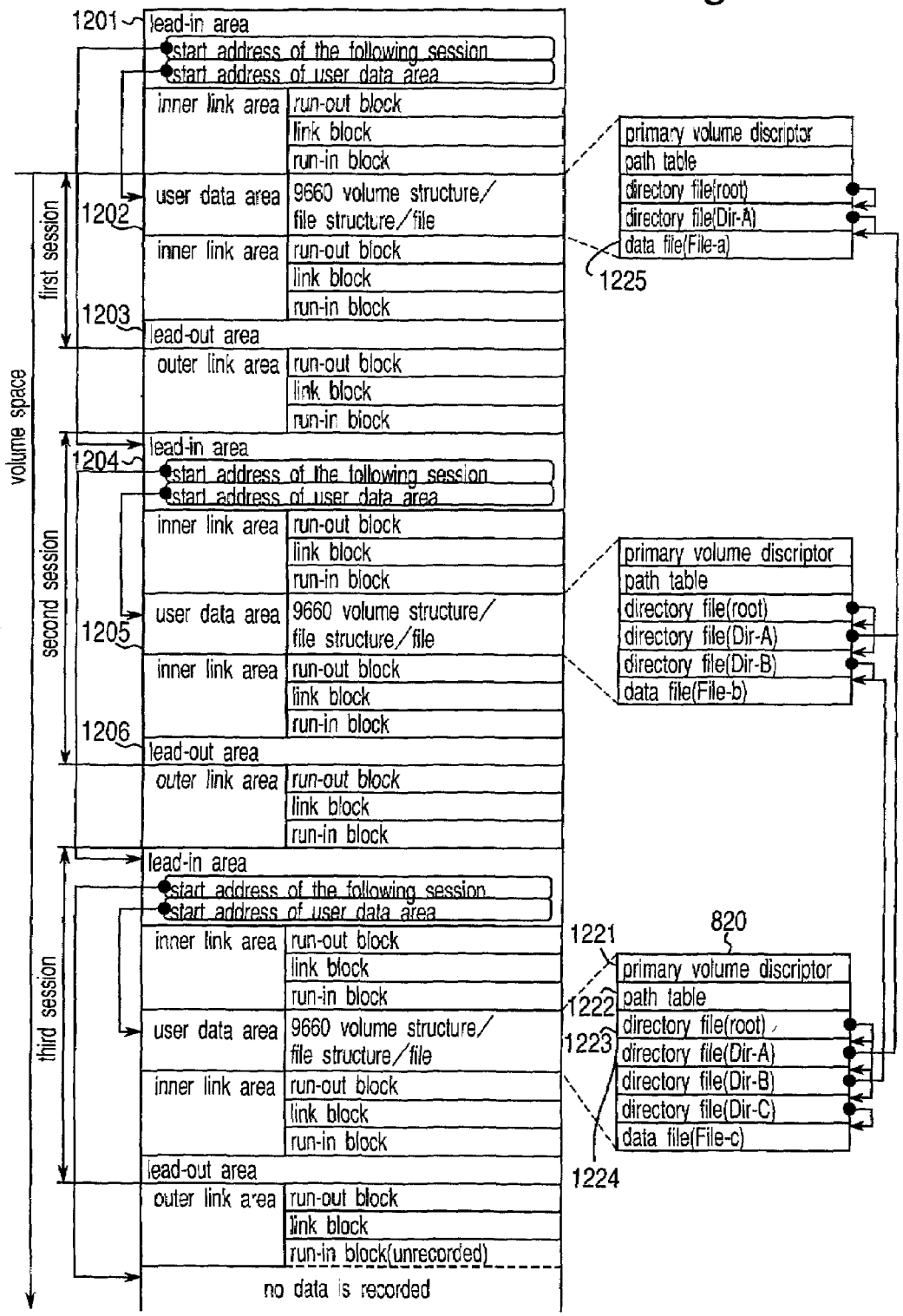
FIG. 12 is a data structure diagram of a CD-R disc recorded with a conventional multi-session method.

A control procedure for a file reproduction process for reading files from a data storage medium according to the present invention is described next below with reference to the block diagram in FIG. 2, the flow chart of this file reproduction process in FIG. 11, and the data structure diagram shown in FIG. 1. It should be noted that data file (File-a) managed according to the directory structure shown in FIG. 13 is reproduced in this file recording process.

(S1101) As in step (S501) of the file recording process, the system controller 201 interprets the volume structure read from main volume structure area 103 or reserve volume structure area 109, and obtains the address of the logical volume integrity descriptor recorded to the open integrity information area 105, that is, the first integrity information, and the address of the unallocated space ICB and root directory ICB recorded to the reserve volume structure area 109, that is, the first chaining information.

(S1102) As in step (S702) of the above described closing process, the system controller 201, following a control program stored internally as the integrity information reproducing means 218, instructs the optical disk drive 205 to reproduce the integrity information area using the addresses obtained in step (S1101) or the following step (S1103). The optical disk drive 205 then attempts to reproduce data from the specified integrity information area.

If data is reproduced from the specified integrity information area, the optical disk drive 205 transfers this reproduced information to the integrity information memory 233 of the memory circuit 202. To retrieve the updated integrity information, the system controller 201 performs step (S1103).

If data reproduction fails because the specified integrity information area is unrecorded, the system controller 201 determines that the last reproduced information is the latest integrity information, and proceeds from step (S1104).

For example, if the data storage medium has recorded thereto data file (File-c) as shown in FIG. 1, the logical volume integrity descriptor (open) recorded to open integrity information area 125 is the latest integrity information.

(S1103) As in step (S703) of the above described closing process, the system controller 201, following a control program stored internally as the integrity information reproducing means 218, detects the address of the next integrity information area contained in the integrity information read in step (S1102).

(S1104) As in step (S502) of the above described file recording process, the system controller 201 instructs the optical disk drive 205 to reproduce from the chaining information area using the address obtained in step (S1101) or the following step (S1105). The optical disk drive 205 then attempts data reproduction from the specified chaining information area. If data is reproduced from the specified chaining information area, the optical disk drive 205 sends the reproduced chaining information to the chaining information memory 234 in memory circuit 202. The system controller 201 then performs step (S1105) to retrieve the updated chaining information.

If data reproduction fails because the specified chaining information area is unrecorded, the system controller 201 determines that the last reproduced information is the latest chaining information, and proceeds from step (S1106).

For example, if the data storage medium has recorded thereto data file (File-c) as shown in FIG. 1, the information recorded to chaining information area 127 is the latest chaining information.

(S1105) As in step (S503) of the above described file recording process, the system controller 201 detects the address of the next chaining information area from the read chaining information.

(S1106) As in step (S504) of the above described file recording process, the system controller 201 references the latest chaining information read from the chaining information area 125, and reads the root directory file 160 according to the allocation descriptor of the file entry for the root directory file contained therein. Next, starting from this root directory file 160, the system controller 201 sequentially reads file entry 151 of directory file (Dir-A) and the directory file (Dir-A) recorded in this file entry, and the file entry 150 for data file (File-a).

(S1107) Finally, the system controller 201 reads data file (File-a) 149 by means of file reproducing means 216, and completes the file reproduction process.

It will be obvious that the above described file reproduction process is accomplished in the same way for data file (File-b) and data file (File-c). It should be noted that file structures accessible from the latest file entry for the root directory are assured of having a complete file structure. It is therefore possible for a particular read-only disk drive to read a particular file by retrieving only the file entry, and it is not necessary to retrieve the integrity information.

The file reproduction process of the present invention can retrieve all data files using only the file structure and volume structure recorded in the volume space. Therefore, a READ TOC command or other similar special command for accessing a lead-in area is therefore not necessary because it is not necessary to read as part of the file retrieval information TOC data recorded to a lead-in area to which a logical sector number is not allocated as described in the related art above.

It is therefore possible to simplify the architecture of software for managing the file system of such data storage media, or controlling the optical disk drive interface, in a personal computer system because all files can be reproduced using only the READ command used for data reproduction operations in the volume space.

Furthermore, compatibility with existing file systems is high because reading is possible using the file system of conventional read-only disk drives once the latest root directory file is found.

INDUSTRIAL APPLICABILITY

A data storage medium according to the present invention records file structure for retrieving the latest recorded file, and file structure containing the address of a unrecorded disk area, as chaining information in the volume space. It is therefore possible in recording and reproducing operations for a newest data file and file structure for managing the latest data file to reproduce the most recent file structure and retrieve an area for recording new data using only data recorded in the volume space.

Furthermore, integrity information for detecting the integrity of file structure in an overrun extent is recorded to the volume space as open integrity information at the start of a data recording operation, and as close integrity information when data recording is completed, in a data storage medium according to the present invention. It is therefore possible to detect an open status occurring when a disk is removed in the middle of a recording operation or when an error occurs during data recording, and thus improve the reliability of recorded data. It is also possible for a read-only disk drive that does not have the ability to detect location in a unrecorded disk area to detect the presence of data that only a recording device can reproduce.

The invention claimed is:

1. A data storage medium readable by a computer for recording and reproducing files managed using a volume/file structure, the number of data recording operations to any same area of the data storage medium being limited, said data storage medium comprising:
- as a part of the volume/file structure, a partition descriptor containing address information for an unallocated space information control block (ICB) for managing unallocated space in a volume space, and
- a logical volume descriptor containing address information for a root directory ICB for managing a directory structure under the root directory, said unallocated space ICB containing address information for a following unallocated space ICB and address information for unallocated space;
- said root directory ICB containing address information for a following root directory ICB and address information for a root directory file; and
- said unallocated space ICB and root directory ICB being recorded to a chaining information area as chaining information that is part of a progressively updated and recorded file structure in order to manage a file of the data storage medium read by the computer.

2. A data storage medium readable by a computer to record and reproduce files managed using a volume/file structure, the number of data recording operations to any same area of the data storage medium being limited, the data storage medium comprising:
- an open integrity information area for recording at least one logical volume integrity descriptor containing address information for close integrity information, said close integrity information indicating a close status assuring the integrity of the volume/file structure recorded in the volume space; and
- a close integrity information area for recording at least one logical volume integrity descriptor containing address information for open integrity information, said open integrity information indicating an open status indicative of a start of a volume/file structure recording operation,
- wherein an overrun extent is recorded in a volume space, said overrun extent having an unrecorded open integrity information area and close integrity information area allocated for respectively update-recording open integrity information and close integrity information, the computer managing a file by reading the data storage medium.

3. A data recording method for recording data to a data storage medium for recording and reproducing files managed using a volume/file structure, the number of data recording operations to any same area of the data storage medium being limited, said data recording method comprising:
- recording as a part of the volume/file structure a partition descriptor containing address information for an unallocated space information control block (ICB) for managing unallocated space in a volume space, and
- recording a logical volume descriptor containing address information for root directory ICB for managing a directory structure under the root directory;
- said unallocated space ICB containing address information for a following unallocated space ICB and address information for unallocated space;
- said root directory ICB containing address information for a following root directory ICB and address information for a root directory file; and
- said unallocated space ICB and root directory ICB being recorded to a chaining information area as chaining information that is part of a progressively updated and recorded file structure.

4. A data recording method for recording data to a data storage medium for recording and reproducing files managed using a volume/file structure, the number of data recording operations to any same area of the data storage medium being limited, said data recording method comprising:
- recording a logical volume integrity descriptor to an open integrity information area, said logical volume integrity descriptor containing address information for close integrity information, said close integrity information indicating a close status assuring the integrity of the volume/file structure recorded in the volume space; and
- recording a logical volume integrity descriptor to a close integrity information area, said logical volume integrity descriptor containing address information for open integrity information, said open integrity information indicating an open status indicative of a start of a volume/file structure recording operation,
- wherein an overrun extent is recorded in a volume space, said overrun extent having an unrecorded open integrity information area and close integrity information area allocated for respectively update-recording open integrity information and close integrity information.

5. A data recording apparatus for recording data to a data storage medium for recording and reproducing files managed using a volume/file structure, the number of data recording operations to any same area of the data storage medium being limited, said data recording apparatus comprising:
- means for recording as a part of the volume/file structure a partition descriptor containing address information for an unallocated space information control block (ICB) for managing unallocated space in a volume space, and
- means for recording a logical volume descriptor containing address information for a root directory ICB for managing a directory structure under the root directory;
- said unallocated space ICB containing address information for a following unallocated space ICB and address information for unallocated space;
- said root directory ICB containing address information for a following root directory ICB and address information for a root directory file; and
- said unallocated space ICB and root directory ICB being recorded to a chaining information area as chaining information that is part of a progressively updated and recorded file structure.

6. A data recording apparatus for recording data to a data storage medium for recording and reproducing files managed using a volume/file structure, the number of data recording operations to any same area of the data storage medium being limited, said data recording apparatus comprising:
- means for recording a logical volume integrity descriptor to an open integrity information area, said logical volume integrity descriptor containing address information for close integrity information, said close integrity information indicating a close status assuring the integrity of the volume/file structure recorded in the volume space; and
- means for recording a logical volume integrity descriptor to a close integrity information area, said logical volume integrity descriptor containing address information for open integrity information, said open integrity information indicating an open status indicative of a start of a volume/file structure recording operation, wherein an overrun extent is recorded in a volume space, said overrun extent having an unrecorded open integrity information area and close integrity information area allocated for respectively update-recording open integrity information and close integrity information.

7. A data reproducing method for reproducing data from a data storage medium for recording and reproducing files managed using a volume/file structure, the number of data recording operations to any same area of the data storage medium being limited, said data reproducing method comprising:

reproducing as a part of the volume/file structure a partition descriptor containing address information for an unallocated space information control block (ICB) for managing unallocated space in a volume space, and reproducing a logical volume descriptor containing address information for a root directory ICB for managing a directory structure under the root directory;

said unallocated space ICB containing address information for a following unallocated space ICB and address information for unallocated space;

said root directory ICB containing address information for a following root directory ICB and address information for a root directory file; and said unallocated space ICB and root directory ICB being reproduced from a chaining information area as chaining information that is part of a progressively updated and recorded file structure.

8. A data reproducing method for reproducing data from a data storage medium for recording and reproducing files managed using a volume/file structure, the number of data recording operations to any same area of the data storage medium being limited, said data reproducing method comprising:

reproducing a logical volume integrity descriptor from an open integrity information area, said logical volume integrity descriptor containing address information for close integrity information, said close integrity information indicating a close status assuring the integrity of the volume/file structure recorded in the volume space; and reproducing a logical volume integrity descriptor from a close integrity information area, said logical volume integrity descriptor containing address information for open integrity information, said open integrity information indicating an open status indicative of a start of a volume/file structure recording operation, reproducing an unrecorded open integrity information area and close integrity information area allocated for respectively update-recording open integrity information and close integrity information in an overrun extent recorded in a volume space.

9. A data reproducing apparatus for reproducing data from a data storage medium for recording and reproducing files managed using a volume/file structure, the number of data recording operations to any same area of the data storage medium being limited, said data reproducing apparatus comprising:

means for reproducing as a part of the volume/file structure a partition descriptor containing address information for an unallocated space information control block (ICB) for managing unallocated space in a volume space, and means for reproducing a logical volume descriptor containing address information for a root directory ICB for managing a directory structure under the root directory;

said unallocated space ICB containing address information for a following unallocated space ICB and address information for unallocated space;

said root directory ICB containing address information for a following root directory ICB and address information for a root directory file; and said unallocated space ICB and root directory ICB being reproduced from a chaining information area as chaining information that is part of a progressively updated and recorded file structure.

10. A data reproducing apparatus for reproducing data from a data storage medium for recording and reproducing files managed using a volume/file structure, the number of data recording operations to any same area of the data storage medium being limited, said data reproducing apparatus comprising:

means for reproducing a logical volume integrity descriptor from an open integrity information area, said logical volume integrity descriptor containing address information for close integrity information, said close integrity information indicating a close status assuring the integrity of the volume/file structure recorded in the volume space; and means for reproducing a logical volume integrity descriptor from a close integrity information area, said logical volume integrity descriptor containing address information for open integrity information, said open integrity information indicating an open status indicative of a start of a volume/file structure recording operation, means for reproducing an unrecorded open integrity information area and close integrity information area allocated for respectively update-recording open integrity information and close integrity information in an overrun extent recorded in a volume space.

* * * * *

UNITED STATES PATENT AND TRADEMARK OFFICE
CERTIFICATE OF CORRECTION

| | | |
|---|---|---|
| PATENT NO. | : 7,050,701 B1 | Page 1 of 1 |
| APPLICATION NO. | : 09/787427 | |
| DATED | : May 23, 2006 | |
| INVENTOR(S) | : Miyuki Sasaki et al. | |

It is certified that error appears in the above-identified patent and that said Letters Patent is hereby corrected as shown below:

On the Title Page of the printed patent, at Item (87), PCT Publication Date, "June 4, 2000" should be --April 6, 2000--

On the Title Page of the printed patent, at Item (57), the Abstract should be replaced in its entirety with the following:
--A lead-out area is recorded and a session is formed each time a file is recorded with the data structure of a disk recorded in the conventional CD-R multi-session format. In this multi-session format the latest file structure recorded to the last session is read by reading in a chaining by means of a special command the first address of the following session recorded to the lead-in area of each session. Furthermore, each session must be closed for this disk to be read on a read-only disk drive. To solve this problem the present inventions records as chaining information and serially reads through the volume space management information for unrecorded disk area and file structure/file information management information to obtain the latest management information. In addition, open integrity information is recorded at the start of recording, close integrity information is recorded at the end of recording, and this information is serially read to obtain information about the volume.--

Signed and Sealed this

Second Day of January, 2007

JON W. DUDAS
*Director of the United States Patent and Trademark Office*